US006455807B1

(12) United States Patent
Scott

(10) Patent No.: US 6,455,807 B1
(45) Date of Patent: Sep. 24, 2002

(54) METHOD AND APPARATUS FOR CONTROLLING A LASER-EQUIPPED MACHINE TOOL TO PREVENT SELF-BURNING

(75) Inventor: William B. Scott, Rochelle, IL (US)

(73) Assignee: W.A. Whitney Co., Rockford, IL (US)

( * ) Notice: Subject to any disclaimer, the term of this patent is extended or adjusted under 35 U.S.C. 154(b) by 21 days.

(21) Appl. No.: 09/603,281

(22) Filed: Jun. 26, 2000

(51) Int. Cl.[7] .............................................. B23K 26/38

(52) U.S. Cl. ........................... 219/121.72; 219/121.62; 219/121.67; 219/121.83; 700/166

(58) Field of Search ...................... 219/121.61, 121.62, 219/121.63, 121.67, 121.72, 121.83; 700/166

(56) References Cited

U.S. PATENT DOCUMENTS

| | | | |
|---|---|---|---|
| 5,373,135 A | * 12/1994 | Beyer et al. | 219/121.67 |
| 5,374,803 A | 12/1994 | Yamada | 219/121.72 |
| 5,399,835 A | 3/1995 | Nakata | 219/121.78 |
| 5,444,211 A | 8/1995 | Nakata et al. | 219/121.67 |
| 5,506,386 A | 4/1996 | Gross | 219/121.64 |
| 5,607,606 A | 3/1997 | Mori et al. | 219/121.67 |
| 5,637,243 A | 6/1997 | Sato et al. | 219/121.67 |
| 5,667,707 A | 9/1997 | Klingel et al. | 219/121.67 |
| 5,670,064 A | 9/1997 | Nakata | 219/121.6 |
| 5,852,276 A | 12/1998 | Yamazaki et al. | 219/121.62 |
| 5,854,751 A | 12/1998 | Di Pietro et al. | 219/121.62 |
| 6,313,432 B1 | 11/2001 | Nagata et al. | 219/121.67 |

FOREIGN PATENT DOCUMENTS

| | | | | |
|---|---|---|---|---|
| GB | 2 253 282 A | 9/1992 | | |
| JP | 59-97788 A | 6/1984 | | 219/121.61 |
| JP | 59-163089 A | 9/1984 | | |
| JP | 3-174989 A | 7/1991 | | |
| JP | 3-254380 A | 11/1991 | | 219/121.61 |
| JP | 4-55079 A | 2/1992 | | 219/121.83 |
| JP | 10-258914 A | * 9/1998 | | |
| JP | 10-289003 A | * 10/1998 | | |

OTHER PUBLICATIONS

Optimizing Cutting and Welding Processing by Controlling the Laser Beam, D. Christopher Hermanns, presented in Lasers in the Workpiece Session at Manufacturing '96 Conference, Sep. 1996.
Bestform Laser Lenses, Special Optics Magazine, No Publication Date.
Solutions Oriented Beam Delivery From LMI Advertising In Industrial Laser Review, No Date.
Lasers, Anthony E. Siegman, University Science Books, No Date Given.
Achieving Consistent Results In Laser Cutting Thick Plate, Published in the Fabricator May 1996, Dennis Ebner.
Laser Cutting Heavy Plate Published in Industrial Laser Review, Aug. 19095, Stephen Hicks and Norine Weiss, No Date.
Beam Expander–Condensers, II–VI Incorporated, No Publication Date.

* cited by examiner

Primary Examiner—Geoffrey S. Evans
(74) Attorney, Agent, or Firm—Leydig, Voit & Mayer, Ltd.

(57) ABSTRACT

A control system is provided for a laser-equipped machine tool which is capable of preventing self-burning. The temperature of the workpiece proximate the cut is monitored, and a numerical control compares the actual workpiece temperature to a prestored temperature limit, empirically determined, which is predictive of the onset of self-burning. If the workpiece temperature approaches or reaches the limit, an abort signal is generated. Upon generation of an abort signal the control processor deenergizes the laser to prevent commencement of self-burning. In addition the processor stores the cutting parameters and the coordinate locations of the aborted cut, so that the processor can later return to finish the cut, and sets a cool-down timer. The processor then causes movement to a next available cutting position, tests the temperature at that position, then commences cutting. When cutting in the second location is complete, if a cool-down timer has expired, the cutting head is traversed to the aborted position, and then the processor retrieves stored information and completes the cut.

37 Claims, 15 Drawing Sheets

METHOD AND APPARATUS FOR CONTROLLING A LASER-EQUIPPED MACHINE TOOL TO PREVENT SELF-BURNING

FIELD OF THE INVENTION

The present invention generally relates to machine tools, and more particularly relates to machine tools using lasers for cutting metal and other materials.

BACKGROUND OF THE INVENTION

Laser-equipped machine tools are often used to cut parts from sheet metal and plate. In such machine tools a laser beam, concentrated by a focusing lens or mirror to a small diameter spot, is directed to position the focal point above, on or below the surface of the material to be cut. The laser beam is directed by the focusing optic through a nozzle disposed immediately above the workpiece, with a pressurized gas being directed through the nozzle, typically coaxially with the laser beam, to assist making the cut. The pressurized gas interacts with the laser beam and material, facilitating the cutting process, and creates a high velocity stream that carries the melted material away from the cut.

Laser-equipped machine tools are usually Computer Numerically Controlled, and are manufactured in many configurations and sizes and with lasers of various types and power. The present invention has applicability to all such types, but will be described in association with one configuration, "flying optics". In that configuration the cutting head is adapted for movement along one axis, such as the Y-axis which is mounted on a bridge adapted for movement in an orthogonal, X-axis. The work is supported on a stationary pallet or table below the bridge. Movement of the cutting head is coordinated with movement of the bridge to define a precise path on the part. The cutting head and laser are controlled to pierce and cut the metal to form holes and shapes in the material, and then to cut the part from the material.

Many same or different parts of common thickness and material type may be cut from a sheet or plate. Such groups of parts are commonly called a nest. Left over material, after the parts have been removed, is called a remnant or a skeleton. A small piece of scrap that falls from a hole cut in a part is called a slug. Remains of material from the cut is called slag. Resolidified material clinging to the part is called dross. The mixture of slugs and slag residue from cutting sheet material is generally called scrap.

Parts can be categorized as two classes, those that have one or more holes or shapes cut within the part boundary and those that consist of a boundary only, no holes or shapes within the part. Nests are cut such that holes within a part are cut first, then the boundary is cut. This is to maintain control of the part until all internal features are cut to insure accuracy of the part. If the boundary were cut first the part could shift, or worse tip, on the table making it impossible to accurately cut features within the part without additional setups or intervention.

Sometimes parts have internal holes or features that could result in substantial scrap. It is common to reduce the amount of scrap by placing one or more smaller parts in these areas. It is possible to have several sub groups of parts that are within parts that are in turn within parts again, etc. until the most practical and efficient use of the material is made. The cutting process for these part groups is the same, in that the parts are cut from inside out. First the holes and internal features are cut in the smallest or furthest part toward the innermost part of the part group, then the boundary of that part(s) is cut, then the next innermost holes or internal features are cut, then the boundary of that part(s), etc., until the boundary of the top level part is cut. A nest could contain none, one, or several instances of groups with parts placed inside another to make efficient utilization of material.

Software programs exist for automatically creating nests of parts. Some automatically evaluate the percent of material utilization in the nest. If targeted utilization has not been achieved the program discards the nest, rearranges the parts and evaluates material utilization until a minimum percentage is achieved. After a satisfactory nest has been created the software will create the program for the laser cutting machine. Some such programming systems also have the ability to determine a cut path such that the cut or machine movement never has to cross the cut line. This is beneficial in reducing risk of the cutting nozzle colliding with parts that tip on the work support and project above the surface of the work being cut.

As higher power lasers with beam qualities suitable for cutting are developed, cutting machine technology advances to cut greater thicknesses of material. For example, it is now possible to cut steel plate 1 inch thick at 24 inches per minute with a cutting machine equipped with a 6-kilowatt laser.

When cutting thick carbon steel plate, the cut quality can rapidly deteriorate when a phenomenon characterized as "self-burning" occurs. Self-burning is a condition that occurs when control of the cutting process is lost and there is a thermal runaway producing a wide kerf which is still closed at the bottom.

The self-burning phenomenon will sometimes clear itself. Sometimes the clearing happens while cutting an edge or arc of the part, but it usually happens at a corner. Cutting velocity decreases when a corner is encountered. Often the program includes a dwell in a corner allowing the lagging tail of the cut to catch up with the leading edge of the cut.

Sometimes control of the cut can be regained by the machine operator intervening to reduce cutting speed with manual feedrate override. Often control of the cut cannot be regained without stopping the process.

When self-burning clears on its own or is cleared by the operator, it leaves a defect on the cut edge. When not noticed, self-burning can result in the production of unacceptable parts which must be reworked or scrapped.

The self-burning phenomenon is troublesome. The machine operator must watch the process and be ready to respond to problems or run the risk of cutting unacceptable parts. In this era of production the operator is often expected to run multiple machines unloading cut parts, loading fresh material, loading the next part program, or even unloading trucks and cleaning the area while the machines cut.

The inventor is aware of at least one method of dealing with self-burning on an automatic basis. It is based on the visible light generated at the cut when self-burning commences. The visible light is reflected back through the cutting lens into the beam path. During normal cutting little visible light is reflected. A sensor is placed above the cutting lens to sense the light reflected from self-burning. It sends a signal to the CNC. In response to the signal, the CNC stops the cut, repositions the cutting head a short distance back along the cut path, then restarts the cut and again attempts to cut through the problem area. CNC setup parameters determine the number of attempts made to make the cut. If the number of attempts is made without success, the CNC will stop the program, send an error message to the CNC operator's screen, and wait for operator intervention.

While this method of dealing with self-burning is beneficial, it remains problematic. First, it detects self-burning after its onset, therefore, the best that can be expected is to produce a part with a small defect on the edge. Second, since self-burning has commenced, it reduces the chance of successfully cutting through the area seconds later.

SUMMARY OF THE INVENTION

The objective of the present invention is to provide a laser-equipped machine tool having ability to avoid self-burning.

Observation of the self-burning phenomenon and examination of parts and skeletons have led the inventor to postulate certain theories and to arrive at several conclusions, as follows.

When the sidewalls of the cut absorb too much heat from the process they melt and fall into the cut. The sudden rush of molten metal is too much to escape from the narrow kerf and closes the cut. The process then feeds itself. With the kerf closed all the heat produced by the laser beam remains in the kerf instead of being removed with material exiting the cut. Oxygen assist gas continues to feed the thermal runaway. This creates a boiling mass of molten steel some of which, in the form of sparks and globules of molten metal, is blown upward, out of the cut, by the assist gas. This makes the self-burning phenomenon visually very noticeable. There is also a noticeable change in the sound of the process.

The inventor has observed that the area in which self-burning occurs is often predictable. Self-burning usually occurs when the cut enters an area which has been recently heated by cutting a nearby feature, wherein the material remains hot. Experiments have shown that it is possible to monitor the temperature of the plate and thereby assess the risk of onset of self-burning when cutting into the area.

Tests were conducted in which an infrared thermometer was used to monitor the surface temperature of a plate while it was cut. The infrared thermometer was selected to assure it would not detect the laser beam. Monitoring the temperature directly in front of the cut path while cutting 12 mm thick construction grade carbon steel, it was observed that cut quality started deteriorating above 300° F. Around 400° F. the cut was lost due to onset of self-burning. In a test involving the same type material except 25 mm thick, it was observed that stability of the cutting process started deteriorating around 180° F. Dross started forming on the lower edge above 200° F. At 220° F. there was high risk of onset of self-burning. After onset of self-burning the temperature rose, within two seconds, to 350–400° F.

It was concluded that the temperature differences between 12 mm and 25 mm and the onset of cut deterioration and self-burning were due to the thickness of the part and the thermal conductivity of the material. It appears that the material was hotter toward the bottom of the part. Heat must therefore be transferred by conduction to the upper surface. The rate of conduction and thus the temperature measured at the surface is dependent upon the thickness and the thermal conductivity of the material.

Based on these observations and conclusions, the objective of this invention is to provide a method and apparatus to assess the risk of the onset of self-burning and to take corrective measures to avoid self-burning.

A more detailed object of the invention is to provide a method and apparatus to assess the risk of self-burning and to automatically take action such that onset of self-burning is avoided by aborting the cut, moving to another area of the plate to resume cutting, then after a time lapse sufficient to allow the aborted area to cool, returning to the abort point and resuming cutting the aborted program.

An object of the present invention is to provide a laser cutting tool with sensing devices capable of detecting a condition in the workpiece indicative of the risk of self-burning onset, and to control or abort the cut as the sensed conditions predict that self-burning is imminent.

It is an object of the present invention to provide a laser-equipped cutting machine having a control system which senses temperature conditions in the workpiece indicative of the risk of onset of self-burning, and a control system which aborts the cut in an ordered, recoverable manner, then repositions the cutting head to begin cutting in a different area of the workpiece.

It is a resulting object to produce a high power laser-equipped machine tool capable of producing high quality cuts in thick material with high efficiency.

A general but subsidiary object of the present invention is to use a non-contact temperature sensor to measure the plate temperature in the region of the cut to predict the risk of onset of self-burning.

A more particular object is to utilize one or more infrared temperature sensors, selected to assure the IR wavelength used will not detect the laser beam, to monitor the temperature of the plate while it is cut to assess the risk of onset of self-burning.

It is a feature of the invention that the cutting head is equipped with a temperature sensor that senses the temperature of the workpiece in the area of the cut. The control system has a cutting parameter library which includes material cutting parameters and specifically includes temperature limits for warning or aborting a cut to avoid the onset of self-burning. If the temperature of the workpiece approaches the limit temperature, steps are taken to terminate the cut. In order to enhance machine efficiency, if the cut is aborted, the control system repositions the cutting head to another feature, part or group of parts, and begins to cut at that point. Before repositioning the cutting head, sufficient information is captured that the cutting head can be returned to resume the cut.

It is a further feature of a preferred embodiment of the invention to provide a laser-equipped machine tool wherein the control system maintains two temperature limits, a warning temperature limit and an abort temperature limit. If the workpiece reaches the abort temperature limit, the cut is stopped immediately, and the CNC repositions the cutting head to a different feature, part or group of parts identified by program flags. The warning temperature limit is lower than the abort temperature limit. If the warning temperature limit is reached, the CNC allows the machine to finish cutting the feature, then sets a flag at that location, then moves the cutting head to another flagged location to resume cutting. If the abort temperature limit is reached while trying to complete the cut, the cut is immediately aborted, the CNC sets a flag at that location then moves the cutting head to another flagged location to resume.

It is another detailed feature that upon jumping to another flagged location or upon return to a previously aborted location, the CNC reads the plate temperature, compares the reading to stored warning and abort values to assure the temperature is within acceptable limits, and if it is not, moves the machine to another flagged location to proceed.

These and other objectives, and features of the invention will become more apparent from the following detailed description when taken in conjunction with the accompanying drawings.

Figure 1:
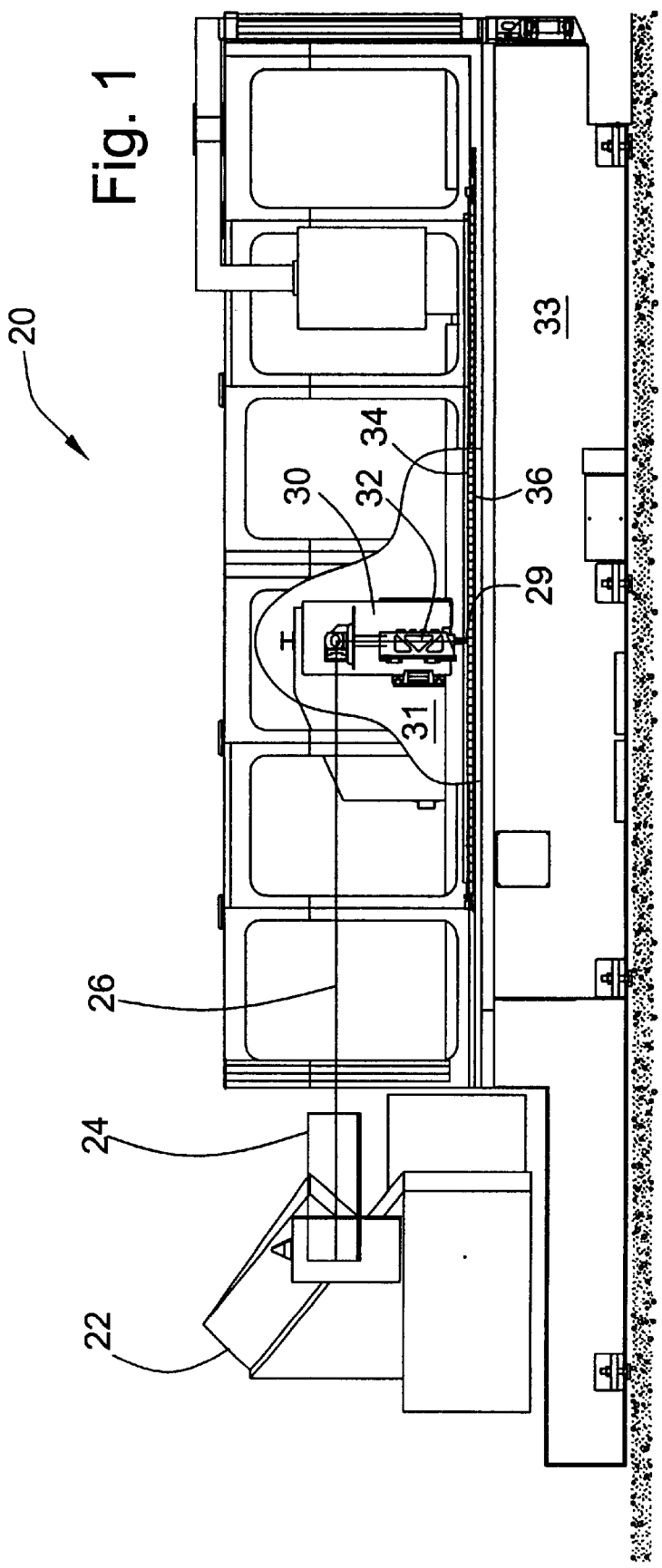
FIG. 1 is a front elevation of a laser-equipped machine tool incorporating a control system exemplifying the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
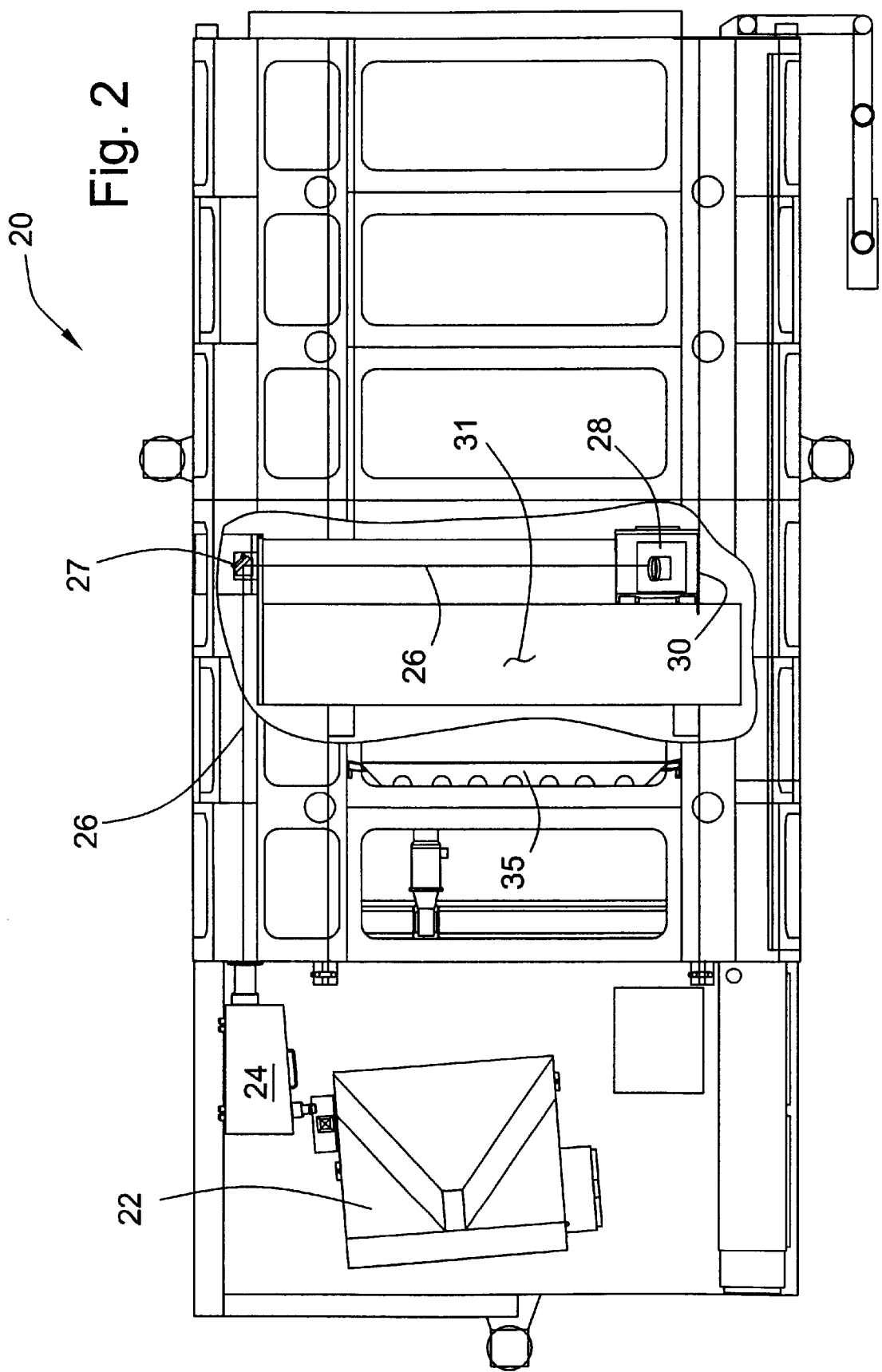
FIG. 2 is a plan view of the machine tool of FIG. 1.

Referring now to the drawings, and with specific reference to FIGS. 1 and 2, a preferred embodiment of the present invention is generally depicted as embodied in machine tool 20. By way of background machine tool 20 includes a laser source 22 that directs a high power laser beam to a collimator 24, which in turn directs a collimated laser beam 26 to first bending mirror 27. Laser beam 26 is then directed to cutting head 30 which includes a second bending mirror 28 and a focusing optic 32 (not shown) which focuses the laser beam onto workpiece 34 which is supported on a pallet 36. Laser beam 26 is projected through a nozzle 29 at the base of the cutting head along with a supply of oxygen assist gas. The focal point of the laser beam is adjusted so that it is approximately at the surface of the workpiece. The position of the focal point can change under the control of the CNC, for particular machining purposes or functions. The laser beam and assist gas interact with each other and with the metal to cut through the workpiece 34.

A machine base 33 supports the operative elements discussed thus far, including the pallet 36 and a bridge 31 that supports the cutting head 30, along with additional elements such as the slag collection bed, and a slag removal system. In summary, the cutting head 30 is adapted to traverse the width of the machine (up and down as shown in FIG. 2) by moving along the bridge member 31 and the entire bridge is adapted to translate left to right as shown in FIG. 1, such that the cutting head 30 is capable, under the direction of the computer control, to trace virtually any path along the surface of the workpiece. The laser is controlled during movement of the cutting head to cut the patterns in the workpiece defined by the CNC program. The illustrated machine configuration, while preferred, is representative of various machine configurations capable of relatively traversing a laser beam and a workpiece for cutting patterns as directed by a CNC.

Figure 3A:
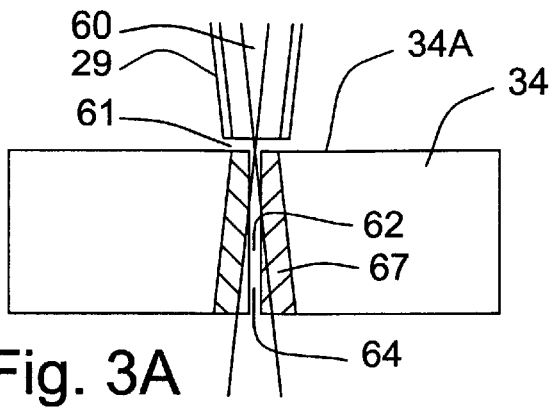
FIGS. 3A–3D are diagrammatic cross-sectional views of a workpiece useful in understanding the self-burning problem.
Figure 3B:
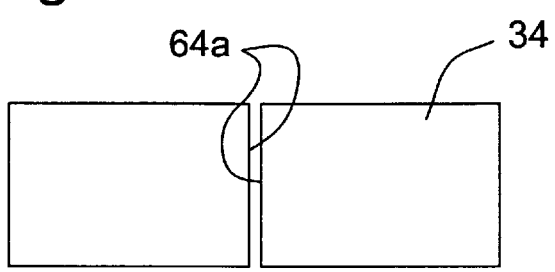

Referring to FIG. 3A, there is shown in enlarged scale a diagrammatical representation useful in understanding the mechanism of a laser cut. The workpiece is illustrated at 34, and is shown to be relatively thick. The nozzle 29 is positioned above the workpiece. The laser beam, illustrated at 60, projects through the nozzle opening along with a flow of assist gas surrounding the beam and directed into the forming kerf 64. The laser beam 60 is focused very sharply at about the surface 34a of the workpiece. The drawing illustrates the divergence of the beam in somewhat exaggerated fashion to better show the position of the focal point 61. The highly focused energy almost instantly heats a column 62 through the workpiece immediately below the point of incidence of the laser beam. During normal cutting, the nozzle and thus the heated column traverse a path defining the cut. The column is open at the bottom side and is translated into the work in the direction of the cut. The assist gas serves to cooperate with the laser beam and the workpiece 34 in vaporizing and melting the material within column 62, the cut zone. The material is intensely melted and the assist gas blows it out of the bottom forming the kerf 64. Kerf 64 has substantially parallel, relatively smooth sidewalls 64a as shown in FIG. 3B. It is noted in passing that adjusting the position of the laser beam focus with respect to the thickness of the workpiece 34 can alter somewhat the shape of the kerf 64, by making it, for example, slightly cone shaped at the top or at the bottom. However, when the system is operating correctly, the walls 64a will be substantially square and relatively smooth.

Figure 3C:
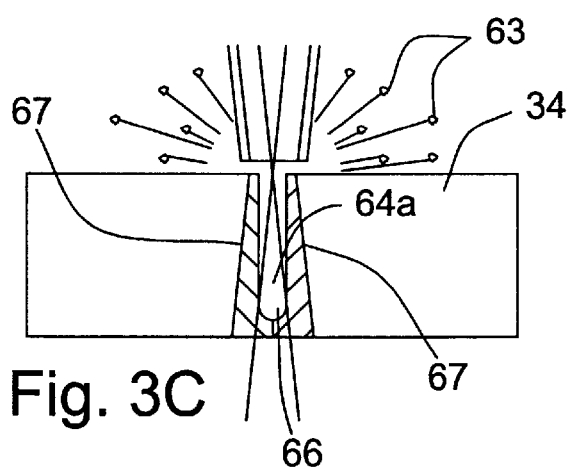
Figure 3D:
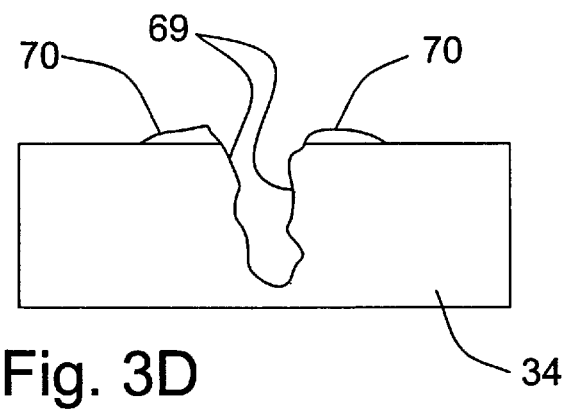

In accordance with the invention, the temperature of workpiece 34 in the area of the cut is used to predict the onset of self-burning. FIG. 3C illustrates the mechanisms at work. The material, illustrated by the hatched areas 67, can become too hot and start melting and falling into the kerf, schematically illustrated in FIG. 3C. As the temperature of the workpiece increases more sidewall material melts and falls into the kerf. When too much material melts the assist gas can no longer blow the material out the bottom of the kerf and a pool, schematically illustrated in FIG. 3C as 66, forms at the bottom of the kerf. The kerf is closed. Pool 66 then absorbs all the energy from the laser beam and the exothermic reaction of the assist gas and becomes still hotter, to the point of boiling and burning. The sidewalls absorb more energy, melt and collapse into the kerf. The fact that the sidewalls have collapsed is illustrated by the wider kerf 64a in FIG. 3C as compared to the kerf 64 of FIGS. 3A and 3B. The process feeds itself and is out of control. With the kerf closed all the heat produced by the laser beam remains in the kerf instead of being removed with material exiting the cut. Oxygen assist gas also feeds the thermal runaway. This creates a boiling mass of molten steel some of which, as sparks and globules 63 of molten metal, is blown upward, out of the cut FIG. 3D diagrammatically illustrates the nature of a cut formed during self-burning, where the sidewalls 69 are neither parallel nor smooth, and dross 70 may form on the top of the sheet or splatter to other areas of the workpiece near the cut. Such a cut is unacceptable.

In practicing the invention, a high power laser cutting machine tool, such as that illustrated in FIG. 1, is provided with a control system capable of assessing risk of onset of self-burning before self-burning commences, and further capable of taking action to prevent the onset of self-burning. Digressing briefly to FIG. 5, there is shown an automatic control system 50 exemplifying the present invention in juxtaposition to a diagrammatically illustrated machine tool 20. The machine tool, as previously described, includes a laser 22, a cutting head 30 having a nozzle 29 positioned proximate a workpiece 34 carried on a pallet 36.

The conventional components of the control system 50 are illustrated in upper block 51, and include a laser beam control module 51a for controlling the on/off state of the laser, in some cases the laser intensity, and in some cases the laser focus. A second module 51b, also conventional, includes a multiple axis beam/workpiece position control. In the illustrated embodiment the position control traverses the cutting head with respect to the workpiece, whereas it is also possible to traverse the workpiece, or some combination of the workpiece and cutting head. The remainder of block 51 is available for other modules which are not of significance in the present description.

In practicing the invention, the control system 50 is provided with a further software module 52 which may interact with other modules within the control system 50, and which serves to avoid the onset of self-burning. The module 52 is shown as including two specifically identified modules. A first risk assessment module 52a, is adapted to assess the risk of the onset of self-burning. As will be described in greater detail below, the module 52a operates through a sensor adapted to monitor the cutting process to continuously assess the risk of the onset of self-burning. In the preferred embodiment, the sensor comprises a plurality of temperature sensors 71–73 adapted to sense the temperature of the workpiece near the cut. The risk assessment module 52a contains empirical data, in the form of tables or the like, which store the temperature profiles associated with the approaching onset of self-burning for workpiece materials of various types and thicknesses.

Further in practicing the invention, a second module 52b is provided within the control system for the purpose of cooperating with and responding to the risk assessment module 52a. The responsive module 52b can take various forms. In the preferred embodiment, the risk assessment module 52a contains two sets of temperature limits, a first warning limit and a second abort limit. When configured with a risk assessment module of that type, the response module 52b takes the necessary action to avoid the onset of self-burning without overcomplicating or interfering with the parts program. Thus, in the preferred embodiment, the responsive module will respond to the sensed temperature reaching the warning limit by continuing the cut until a convenient break point is reached (usually at a geometry intersection). At that point, if the temperature remains at or above the warning level, the responsive module 52b will cooperate with the modules 51a and 51b to terminate the cut and to traverse the cutting head/workpiece relationship to resume cutting at a new location. The responsive module 52b also responds to the temperature reaching the abort limit by terminating the cut immediately, storing sufficient cutting parameter and position data to be able to resume the cut, then, if desired, traversing to a new location on the workpiece to resume cutting.

The module 52 is shown as having additional functional locations for other modules, as needed, to configure a particular implementation of the invention. However, in its broadest sense, the software control represented by the block 51 performs the normal cutting functions, and has associated therewith two primary modules, one a risk assessment module which responds to conditions relating to the cut to determine proximity to the onset of self-burning, and a second, responsive to the first, which takes the necessary action to avoid the onset of self-burning.

Figure 5:
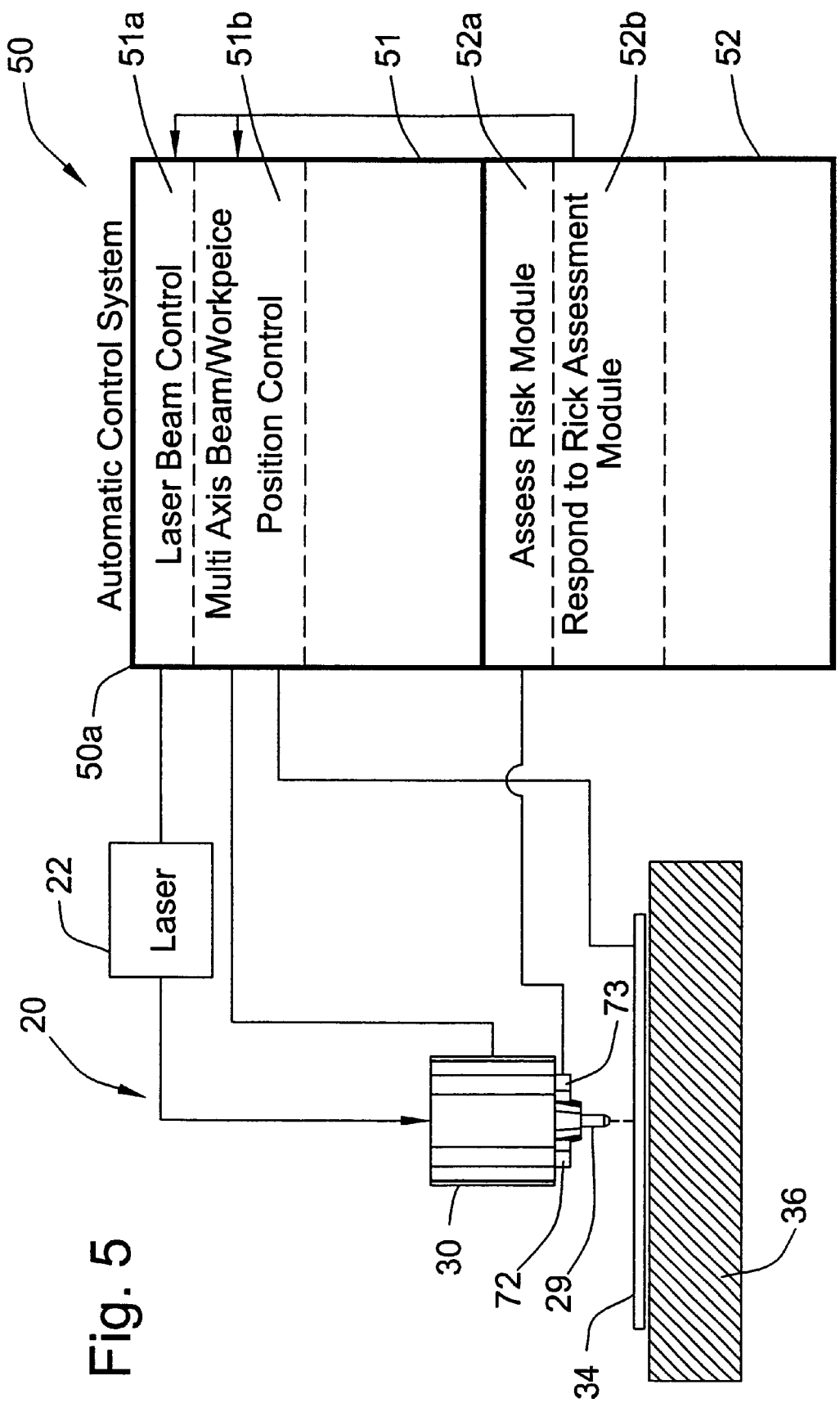
FIG. 5 is a schematic block diagram illustrating certain system aspects of the control system of the present invention.
Figure 6:
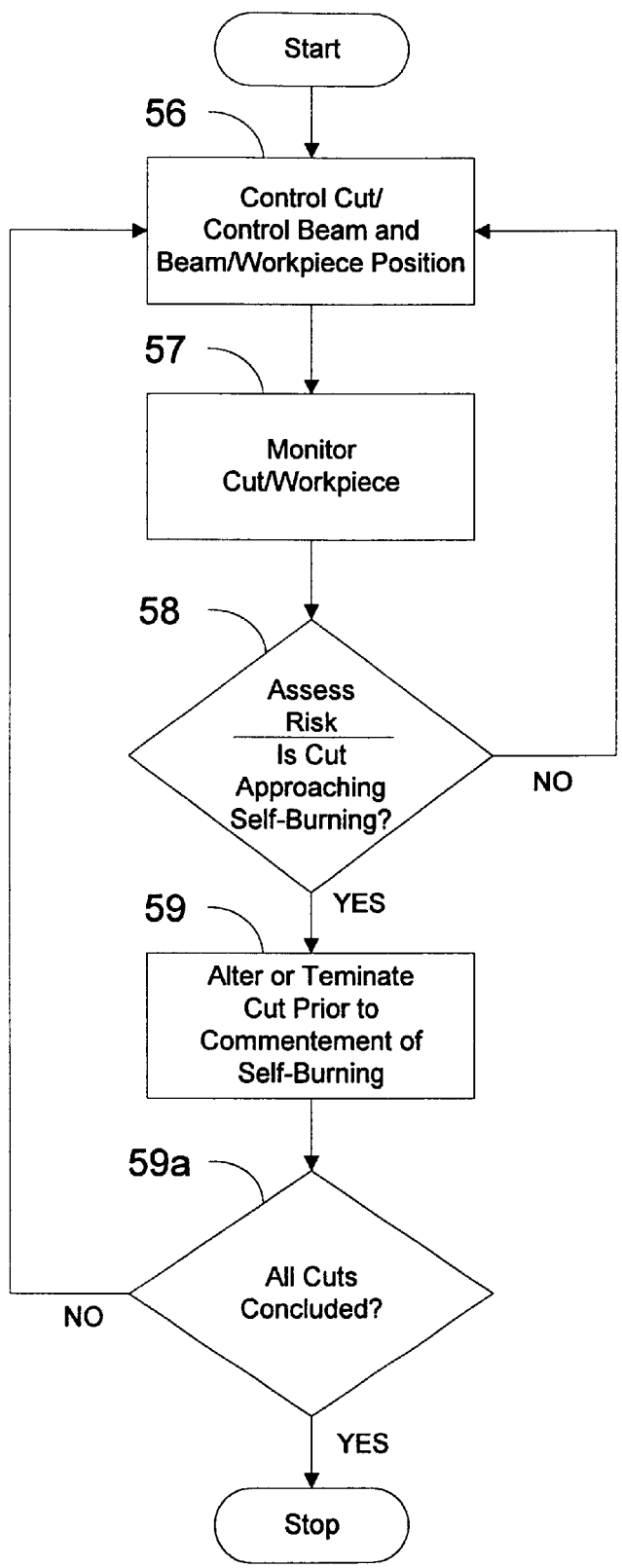
FIG. 6 is a flowchart illustrating the process of the invention in its broad and basic form.

While FIG. 5 shows the structure of the machine tool and control system constructed in accordance with the invention, FIG. 6 is a flowchart demonstrating the functionality of that system in practicing the invention. The flowchart represents the functionality at a reasonably global level, as will be seen. After initiation, the process proceeds to a first step 56 which involves all of the aspects of the machine tool in controlling the cut. As is conventional, the beam/workpiece position is controlled in order to trace the beam across the workpiece in the desired path. Other parameters controlled are the beam characteristics itself (such as by collimating the laser beam), the nozzle height above the workpiece, the power of the laser, the type and flow of assist gas, and all of the other elements which would be well understood by those of skill in this art.

In practicing the invention, a step 57 is continuously performed to monitor the cut, by monitoring a condition of the workpiece. In the preferred embodiment, the monitoring step 57 is performed by continuously monitoring the temperature of the workpiece near the cut.

As the monitoring continues, the step of assessing the risk of self-burning 58 is also continuously performed. The assessment is preferably performed on the basis of empirical data in which the variables are material type and temperature near the cut. This data, collected by empirical testing of the type described in an earlier portion of this specification, is stored in memory and accessed during cutting to set specific limits for the actual machining conditions. Stored temperature limits are associated with the step 58 which determines the risk of onset of self-burning. Step 58 performs its assessment by performing the test—is the cut approaching self-burning. If it is not, a negative result of the test branches the program back to the control cut step 56. Thus, this loop continues to cycle in normal operation while the system continues to monitor and assess the risk of onset of self-burning, but has not yet found a condition in which the self-burning condition might be approached.

However, if the test 58 indicates a positive result, the program branches to a step 59 which, in its broadest sense, either alters or terminates the cut prior to the commencement of self-burning. For example, if the assessment indicates that self-burning is imminent, the cut will be terminated immediately, and the program will store sufficient information to resume the cut at a later time. If the assessment indicates that the temperature is rising, but self-burning is not yet imminent, the cut program is altered by preparing to abort the cut, but continuing the cut until a convenient stopping point is reached, then aborting the cut. The stopping point is usually at a geometry intersection (where the parts program switches from one cut to another). This allows the machine to terminate the cut at a location which is least likely to create a defect or discontinuity in the finished part.

Having taken a corrective actions in the step 59, the program proceeds to a step 59a to test whether all cuts have been concluded. If they have not, and additional cutting remains to be done, the program returns to the control cut module 56 to continue cutting on the altered path determined by the module 59. When all cuts are completed, a positive test from the module 59a branches the program to its termination routine.

In summary, the program steps of FIG. 6 illustrates the association of the normal machining functionality of a high power laser equipped machine tool with the steps of sensing the condition, preferably the temperature of the workpiece, proximate the cut, which condition is predictive of the onset of self-burning, and taking corrective measures prior to the onset in order to prevent self-burning.

For monitoring the condition of the workpiece at the cut, it is preferred to utilize temperature sensors, preferably of the non-contact variety, as will now be described. The cutting head 30, FIG. 1, can move in any direction across the surface of the workpiece. Three infrared temperature-measuring devices, 71, 72, and 73, shown diagrammatically in FIGS. 4A and 4B, having a temperature sensing range of 100° F. to 500° F., are mounted in a triangular arrangement about the cutting head 30. The infrared detectors are mounted such that the temperature sensing areas, 72A, 72B, and 72C, FIG. 4C, on workpiece 34 are approximately tangent to and surround nozzle 29 for monitoring the temperature ahead of cutting kerf 64. The sensing areas overlap such that the temperature can be monitored in the area near the cut regardless of the direction of the cut.

Infrared detectors of this temperature range typically respond to infrared light of 7 to 14 micrometer wavelength. $CO_2$ laser light, wavelength 10.6-micrometer, can interfere with accurate temperature measurements. The selected sensors are preferably filtered to avoid sensing the $CO_2$ laser beam at 10.6 micrometers.

Figure 4A:
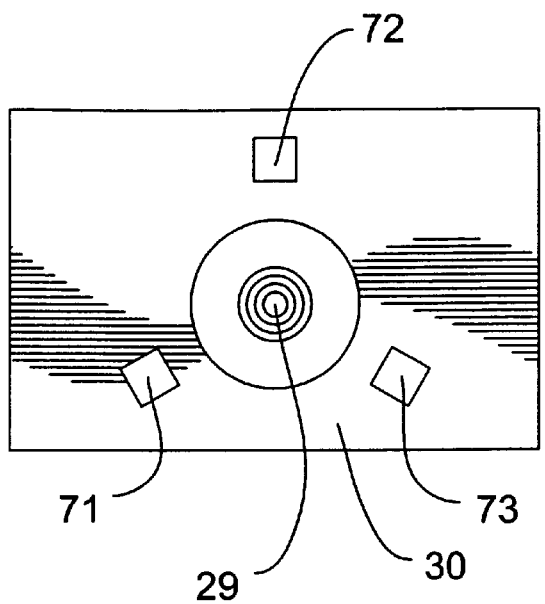
FIGS. 4A and 4B are bottom and elevation views of the cutting nozzle showing an array of temperature sensors.
Figure 4B:
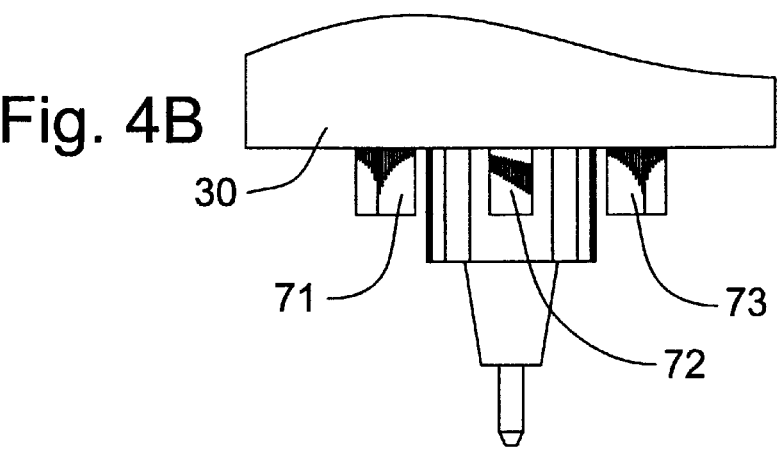
Figure 4C:
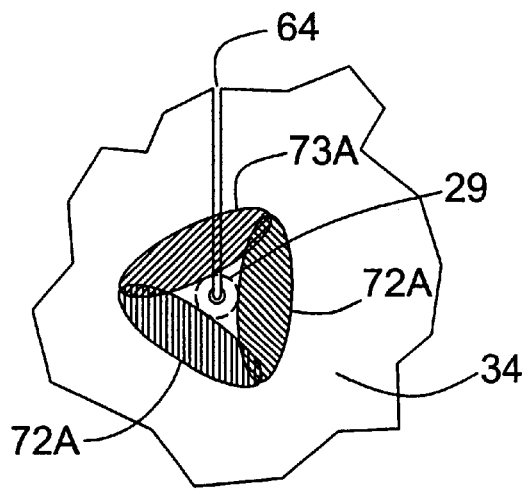
FIG. 4C is a diagram showing the coverage areas of the sensors of FIGS. 4A and 4B.

The use of infrared temperature sensors and the positioning illustrated in FIGS. 4A, 4B and 4C represents the currently preferred arrangement. However, it will be apparent to those skilled in the art that the invention is not limited to use of infrared detectors or to the positioning of those detectors with respect to the cutting head; the invention most broadly deals with sensing conditions near the cut and taking corrective action before, not after, onset of self-burning.

Figure 7:
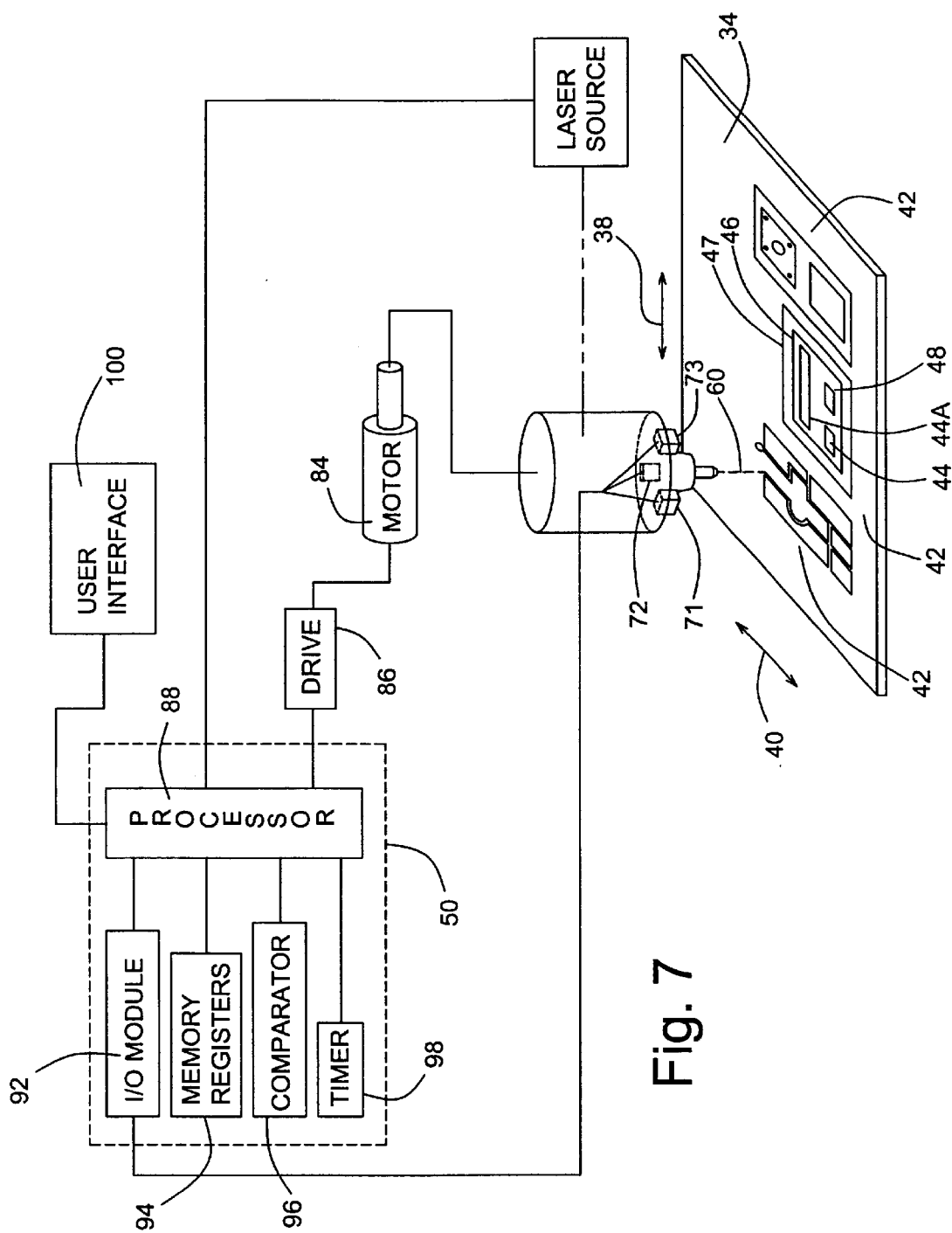
FIG. 7 is a block diagram representing aspects of the invention in its broad and basic form.

Turning now to FIG. 7, certain elements of the machine tool and the control system are shown in association with a diagrammatically illustrated workpiece 34 juxtaposed to a cutting head 30.

Shown diagrammatically and in simplistic fashion in FIG. 7, workpiece 34 is divided into a plurality of nests 42. Smaller pieces 44 and 44A can be cut from the waste material of rectangular opening 46 of larger rectangular part 47 and thereby reduce the amount of waste material 48.

As shown in FIG. 7, servomotor 84 is drivingly connected to cutting head 30 to control the position of cutting head 30 with respect to workpiece 34. One of ordinary skill in the art will readily recognize that first and second motors are typically employed to control movement of cutting head 30 on the X and Y axes respectively. For simplification, only one motor is shown. The axes of motion of the cutting head over the workpiece are indicated at 38 and 40. Servo drive 86 is electrically connected to processor 88, which is part of the overall computer control system 50 of machine tool 20. Depending on the signals directed by processor 88 to drive 86, the motion of servomotor 84 and thus position of cutting head 30 can be controlled with respect to workpiece 34.

It is also shown in FIG. 7 that temperature sensors 71–73 are connected to processor 88 by input/output module 92. Processor 88 is continually updated as to the temperature of the workpiece surface near the kerf 64. Memory locations 94 are provided to, among other things, store the warning and abort temperature limits for avoiding self-burning. Comparator 96 represents the mechanism by which processor 88 can compare the measured temperature to the temperature limits stored in memory locations 94. FIG. 7 also shows the inclusion a timer 98 for of timing the cool-down period after a cut has been aborted. User interface 100 is provided to allow the operator of machine tool 20 to input information, such as the type and thickness of material to be processed, such that appropriate temperature limits are transferred to the memory locations 94 for comparison.

Figure 8:
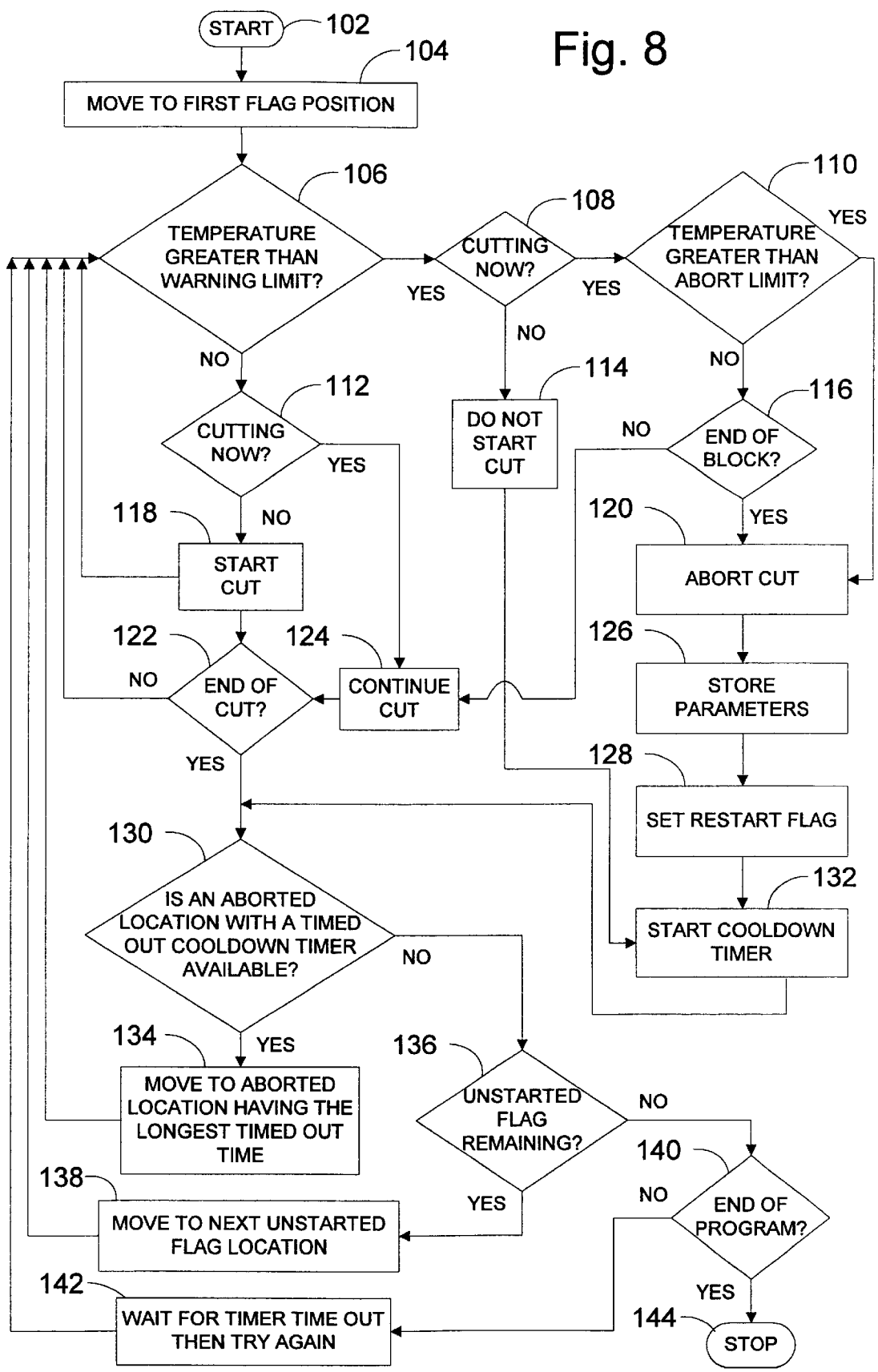
FIG. 8 is a flowchart depicting an exemplary embodiment of the logic employed by the control system of the present invention.

Attention will now be directed to the process flow aspects of the present invention, with further reference to FIG. 8 which shows an exemplary embodiment of a machine tool process flow which functions in accordance with the present invention. Start 102 represents the start of a part program. At 104 the control system causes the cutting head to be positioned to the first flagged start location. At 106 the workpiece temperature is measured by temperature sensors 71–73 and compared to the warning limit. The temperature will be less than the warning limit so operation will proceed to 112. At 112 it will be determined that cutting has not commenced so operation will proceed to 118 which will cause the cut to be started then return to 106 to continue to monitor the process.

At 106 the workpiece temperature is measured and compared to the warning limit. If the temperature is less than the warning limit the control determines cutting is in process at 112 and continues the cut, 124, then checks if it is at the end of the cut at 122. If the end of the cut has not been reached the control returns to 106 to continue the monitoring process. If the end of the cut has been reached the control moves to 130 and checks for an aborted location. In this case there would be none so the control would move to 136 and check for remaining start flags. Assuming there are flags remaining, the control would proceed to 138 positioning the cutting head at the next flagged starting position then return to 106 to check the temperature. If the temperature is and remains less than the warning limit the control system will continue as described until at 136 there are no flags remaining, the end of the program, 140, is achieved then will stop 144.

If after moving to a new start location, at 106 the control system determines plate temperature exceeds the warning limit, and at 108 determines cutting has not started, it will not start the cut, 114, but will start a cool down timer, 132, then check to see if there are aborted locations available, 130. Assuming none are available and that there are no start flags remaining, 136, and that the end of the program has not been reached, 140, the control system will wait for the timer to time out, 142, then return to 106. In such case the control system will remain in this loop until the temperature has cooled sufficiently to allow starting the cut.

If after moving to a new start location, at 106 the control system determines plate temperature exceeds the warning limit, and at 108 determines cutting has not started, as in the prior example it will not start the cut, 114, but will start a cool down timer, 132, then check to see if there are aborted locations available, 130. Assuming none are available but there are start flags remaining, 136, the control will proceed to 138 positioning the cutting head to the next flagged starting position then return to 106 to check the temperature. If the temperature is less than the warning limit the control system will determine it is not cutting, 112, start the cut, 122, then return to 106 to continue monitoring the process.

While processing a part, if the control system determines at 106 that plate temperature exceeds the warning limit and cutting is in process, 108, but temperature is less than the abort limit, 110, it will continue cutting until the next geometrical intersection is reached, typically a "end-of block" in the part program, 116, then abort the cut, 120, store parameters to allow a later return, 126, set a restart flag, 128, start a cooldown timer, 132, then check for an aborted location with a timed out cooldown timer at 130. Assuming there are aborted positions available, the control system will select and move to the location having the longest timed out time, 134, then return to 106 to continue. If no aborted locations are available at 134, but there are start flags remaining, 136, the control system will select and move the cutting head to the next available start flag, 138, then return to 106 to continue.

While processing a part, if the control system determines at step 106 that plate temperature exceeds the warning limit and cutting is in process, 108, and that the plate temperature is equal to or greater than the abort limit, 110, it will abort the cut immediately, 120, store parameters to allow a later return, 126, set another restart flag, 128, start a cooldown timer, 132, then check for an aborted location with a timed out cooldown timer, 130. Assuming there are aborted positions available, the control system will select and move to the location having the longest timed out time, 134, then return to step 106 to continue. If no aborted locations are available at step 130, but there are start flags remaining, 136, the control system will select and move the cutting head to the next available start flag, 138, then return to 106 to continue.

The control system will process the part in such manner until no aborted locations remain, 130, no start flags remain, 136, and the end of the program is reached, 140, then stop, 144.

The inventor refers to the control system diagrammed in FIGS. 7 and 8 as an Adaptive Temperature Control System. Such a control system is configured to operate with commercially available nesting programming systems, not shown, that assure parts are cut from the inside out, in other words, that the outer boundary of a part or group of parts is not cut until all internal features have been cut. The parts program is modified to associate a plurality of start flags with particular cuts. Those particular cuts are selected to be jump points for initiating a new cut in the event a cutting sequence is terminated or aborted earlier in the program. These start flags associated with preselected cuts in the parts program and other flags created at the time cuts are aborted, all as taught herein are utilized when the control decides which aborted cut and/or start point flag is to be processed next.

FIGS. 9A–9G are depictions of a workpiece with multiple nests, showing how flags can be set up to assign cut starting positions and to rank them in some order, and to demonstrate how the system can move from cut starting point to cut starting point in accordance with the invention. In conjunction with these figures, the following terms and definitions will be used. A flag is a marker utilized by the CNC to implement the adaptive temperature control of this invention. In the associated table that appears at the end of this specification, flags are numbered, and each number has a unique position. Flags starting with a "P" are assigned to the predetermined start flags as described above. Flags that have a "C" designator are those that are assigned by the machine control system upon an interrupt of cut in accordance with the adaptive temperature control system of this invention.

In the nest, a group number identifies a first level nest part perimeter which may or may not contain holes or parts within its boundary. A level number identifies a level of a boundary within a group. Level 1, for example, is the perimeter of the group or part. Higher level numbers identify other holes, shapes, or part boundaries contained within a group and within other levels. Thus, for example, a cut at level 6 will be within the boundary of a level 5 cut which in turn is within the boundary of a level 4 cut, etc. A feature number identifies an absolute location in the nest. In the associated chart, each feature number is given a two-digit identifier. Each of the digits is representative of a start coordinate. For example, the feature number 01 would be representative of the starting coordinate of the feature at the coordinates X and Y which may be for example X=1234.56 mm and Y=9876.54 mm. These coordinates define the start cut point for the feature. The part program would define the overall shape of the feature to be cut starting at the specified coordinates.

Figure 9A:
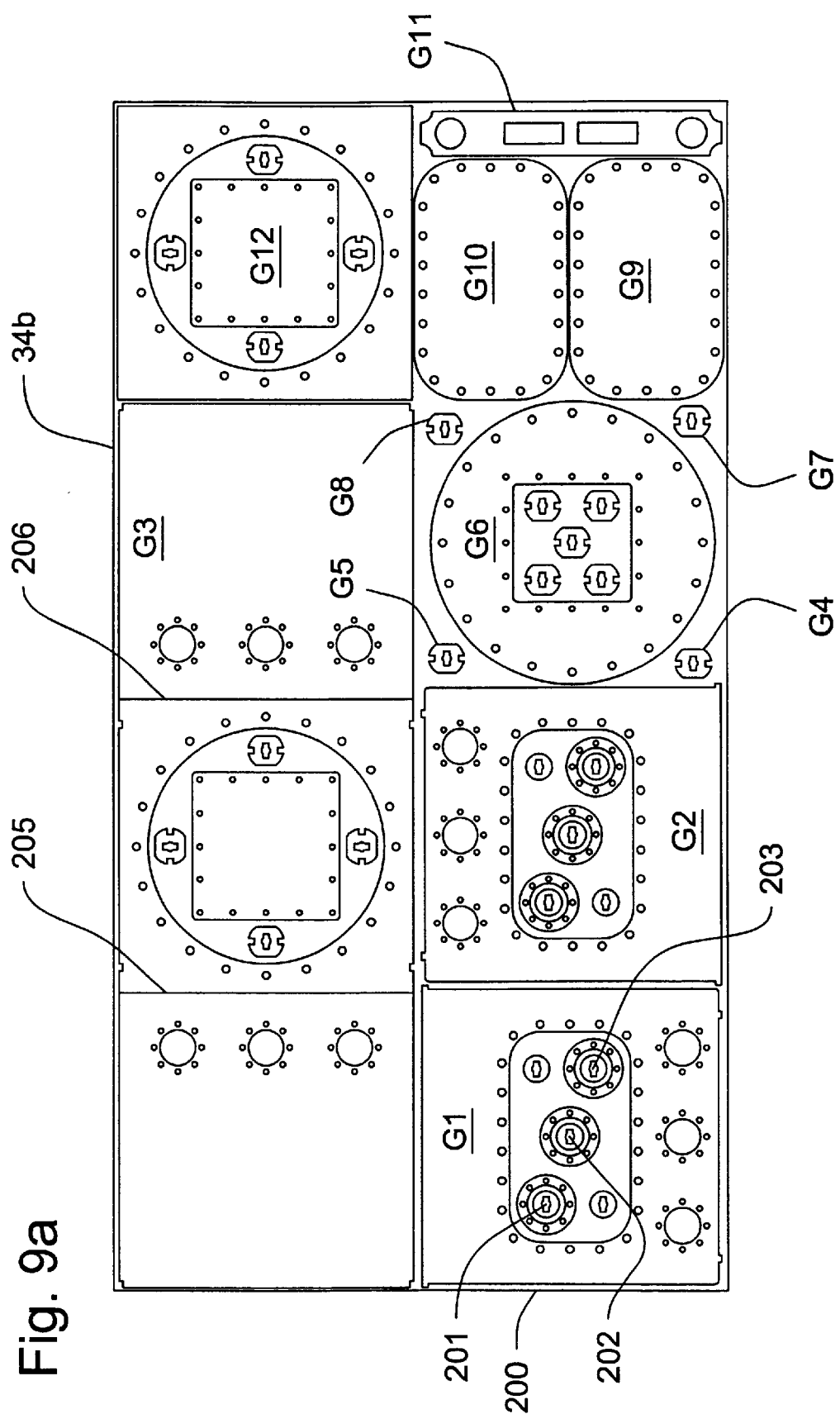
FIGS. 9A–9G are diagrams illustrating a parts layout to be cut from a plate, and are useful for understanding the flagging and restart aspects of the present invention.

Referring to FIG. 9A, there is shown an overall workpiece 34b having a large number of features arranged thereon. The control system of the machine tool is programmed to traverse the cutting head to cut each of the features. Thus, each of the solid lines on the figure represents a cut to be made by the machine tool. As shown in FIG. 9A, the features are arranged in groups, with each group being defined by an outer boundary. For example, the first group G1 is the group of features in the lower left hand part of the workpiece surrounded by the perimeter 200. Group GI represents a multiple level cut in which the perimeter 200 will be the lowest level L1. Other shapes within the perimeter will be at higher levels, with the center most three shaped cut outs 201, 202, and 203 being at the highest level, L6 in this example.

Group G3 in the upper left hand portion of the drawing illustrates a large piece with a number of cut outs and having two etched fold lines 205, 206 to form three sides of a box. Groups G4–G8 in the lower portion, right of center of the workpiece represent a number of individual groups or parts which are not surrounded by a common boundary.

A table representing a program for cutting the nest illustrated in FIG. 9A is reproduced at the end of this specification. Certain liberties have been taken to substantially reduce the length of the program representation. Also it is clearly not the only program that could cut the nest. Assume that a conventional parts nesting program, which has been customized to set the cut starting point flags, has determined the cutting order. Note that the program could be modified, after creation of the nest, assigning starting flags at various points in the part. In this example the flags are intended to identify the "next available cut start point" in case a cut is terminated prematurely. It will be noted that not all cuts are identified with a starting point flag. In the preferred embodiment, only selected cuts are identified, and the cuts are selected on the basis of the overall geometry of the workpiece. For example, the starting point P02, 01, 02, 02 is identified with cut 21 in the Cutting Table. That cut is selected as an appropriate "next available" starting point in the event a cut is aborted at any of the features prior to cut 21. Cut 21 is selected on the basis that it is sufficiently distant from any of the cuts which might have caused the abort condition, yet close enough to avoid unwanted lengthy traverses of the cutting head. Other factors which might impact the selection of a flagged starting point will be the crossover of the nozzle of cut parts, and other factors well known to those skilled in this art. Similarly, the juxtaposition of starting flags on each of cuts 21, 22, and 23 recognizes that each of the cuts is very localized, and it is possible to move from one overheated condition (should that occur) to a sufficiently distant but reasonably closely adjacent set of features (say from cut 21 to cut 22) in an efficient manner.

In short, the program is intended to sequence through the steps in the order specified in the table. If, during the course of cutting, either a warning or an abort temperature limit is reached, the control system will terminate the cut and move the cutting head to the next available cut starting point identified by the next flag in sequence. When cutting is terminated prematurely, a new flag is set within the table in real time at the point of termination. For example, if an abort temperature limit is reached, cutting is immediately terminated, a C flag is set at the point of termination, and parameters are saved, including location coordinates and cutting parameters. Like the P flag, the C flag contains complete information on the cut so the cut can be resumed later. When the cool down timer expires and the program sequences to the next available cutting position, in the form of a previously aborted cut, the C flag will identify the cut start point just as the flag identifies a cut start point for a preprogrammed position.

Figure 9B:
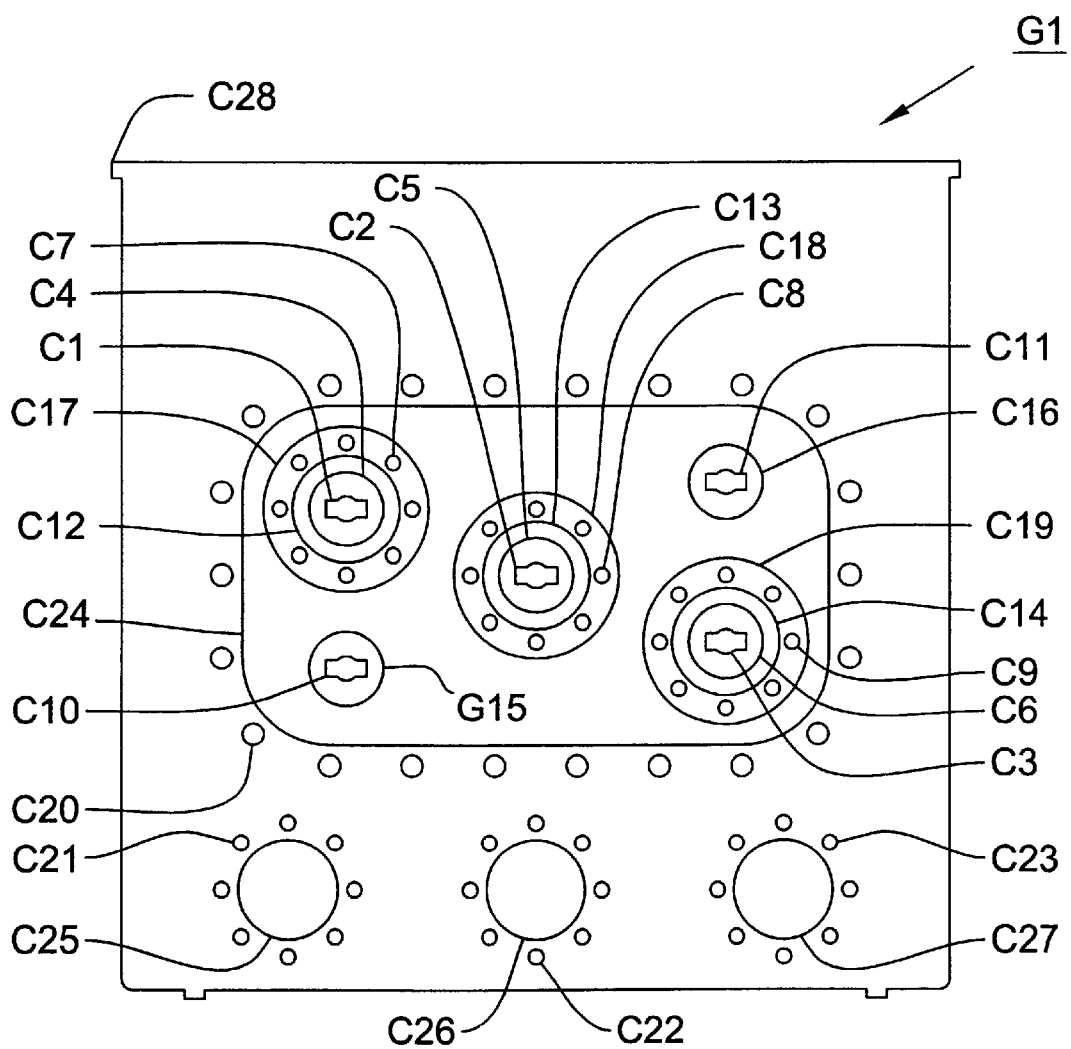
Figure 9C:
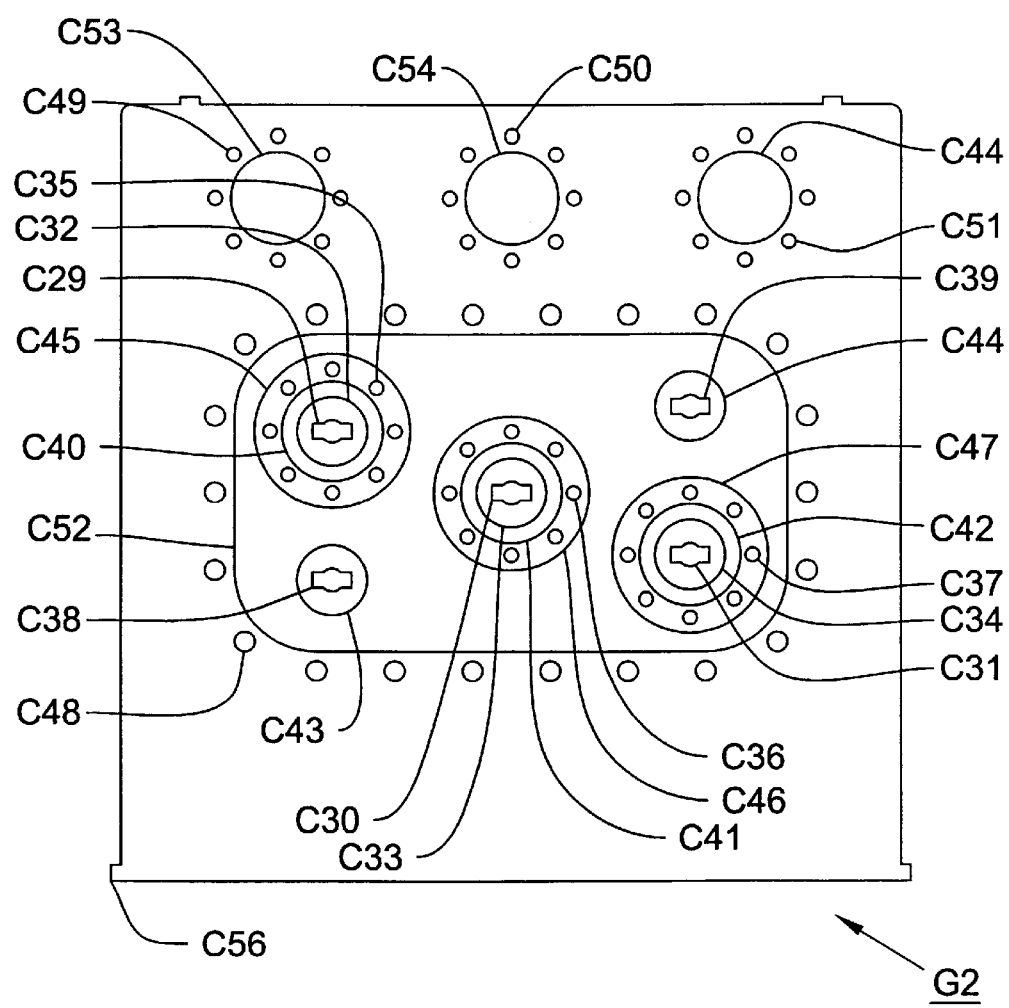
Figure 9D:
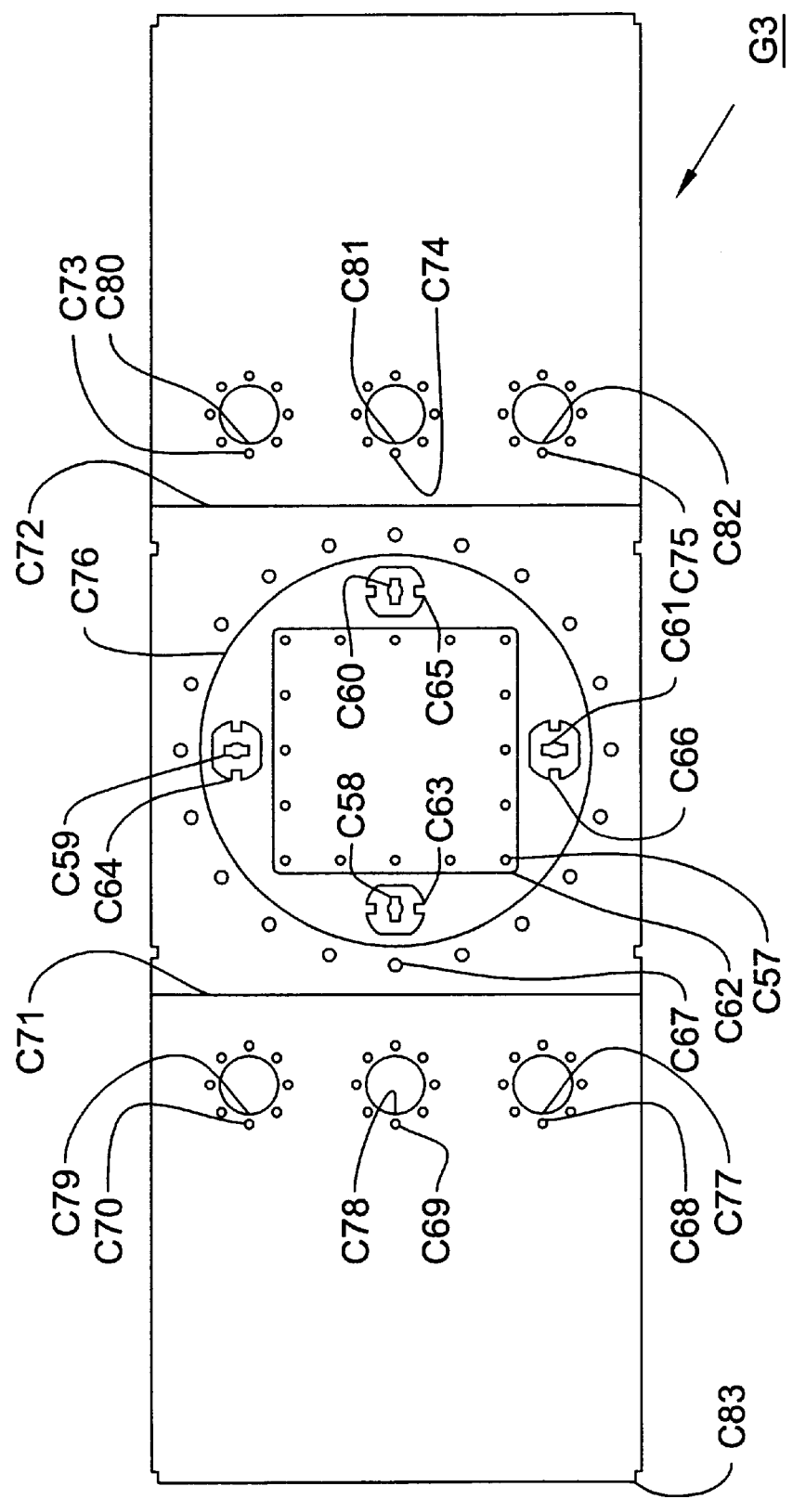
Figure 9E:
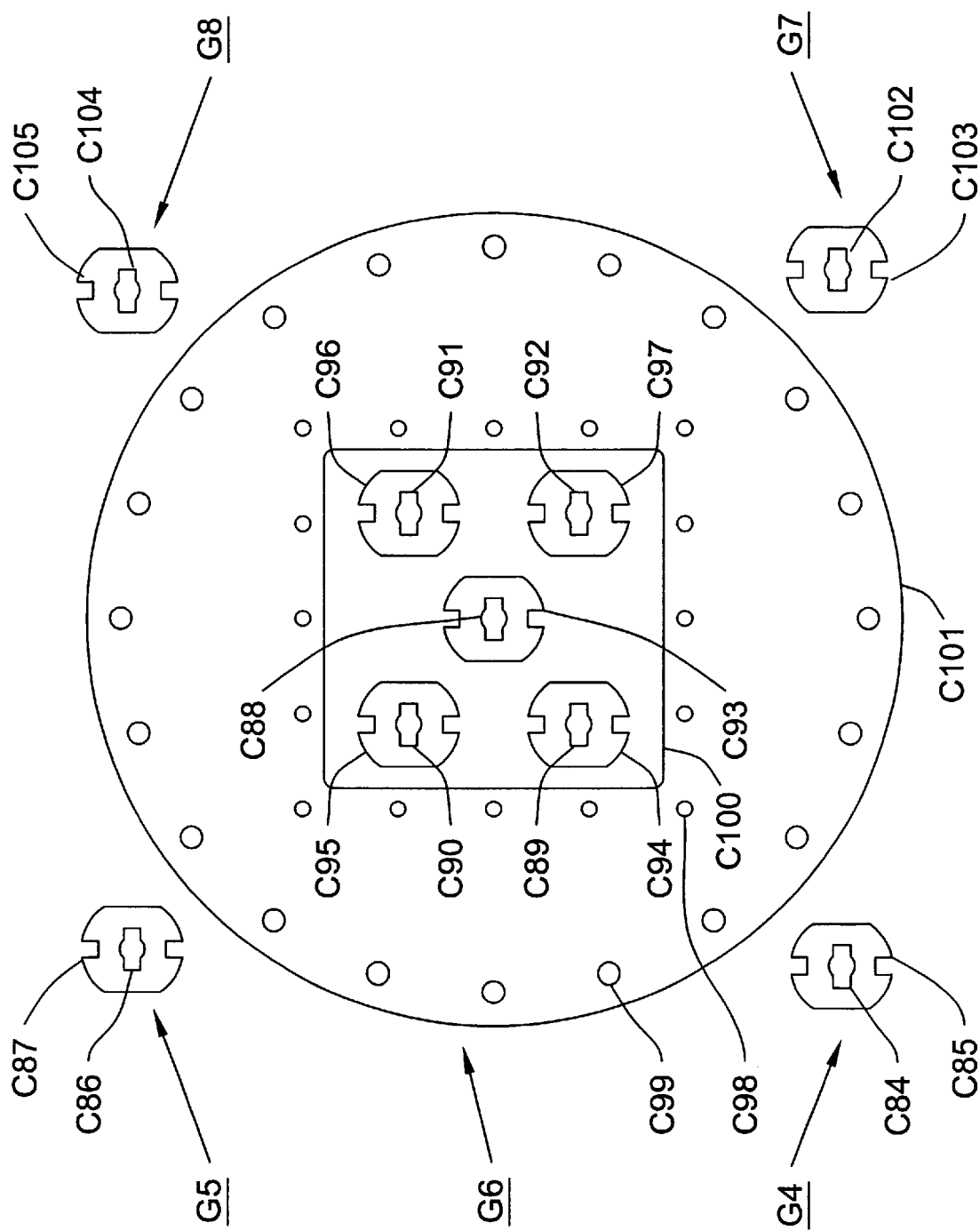
Figure 9F:
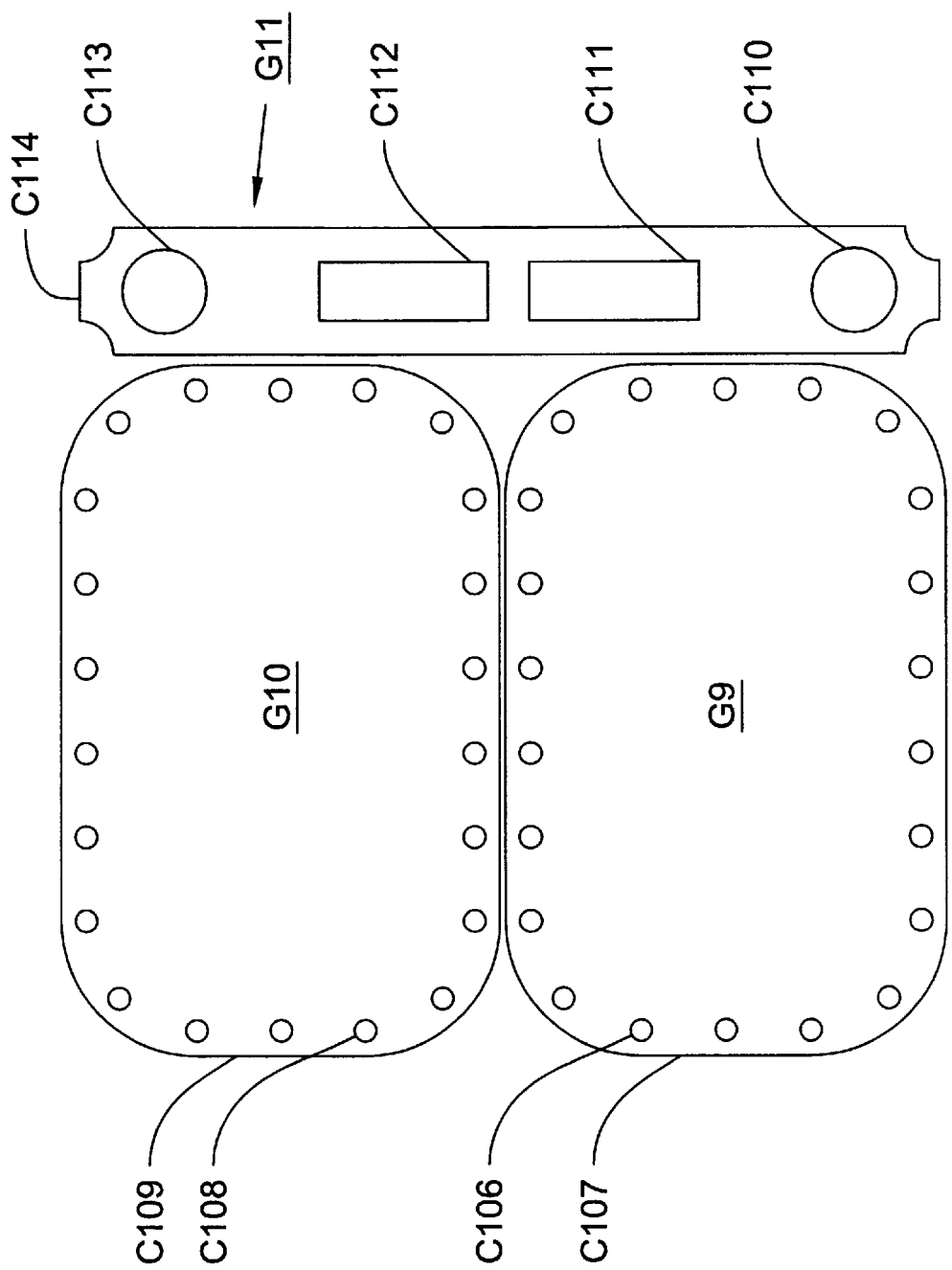
Figure 9G:
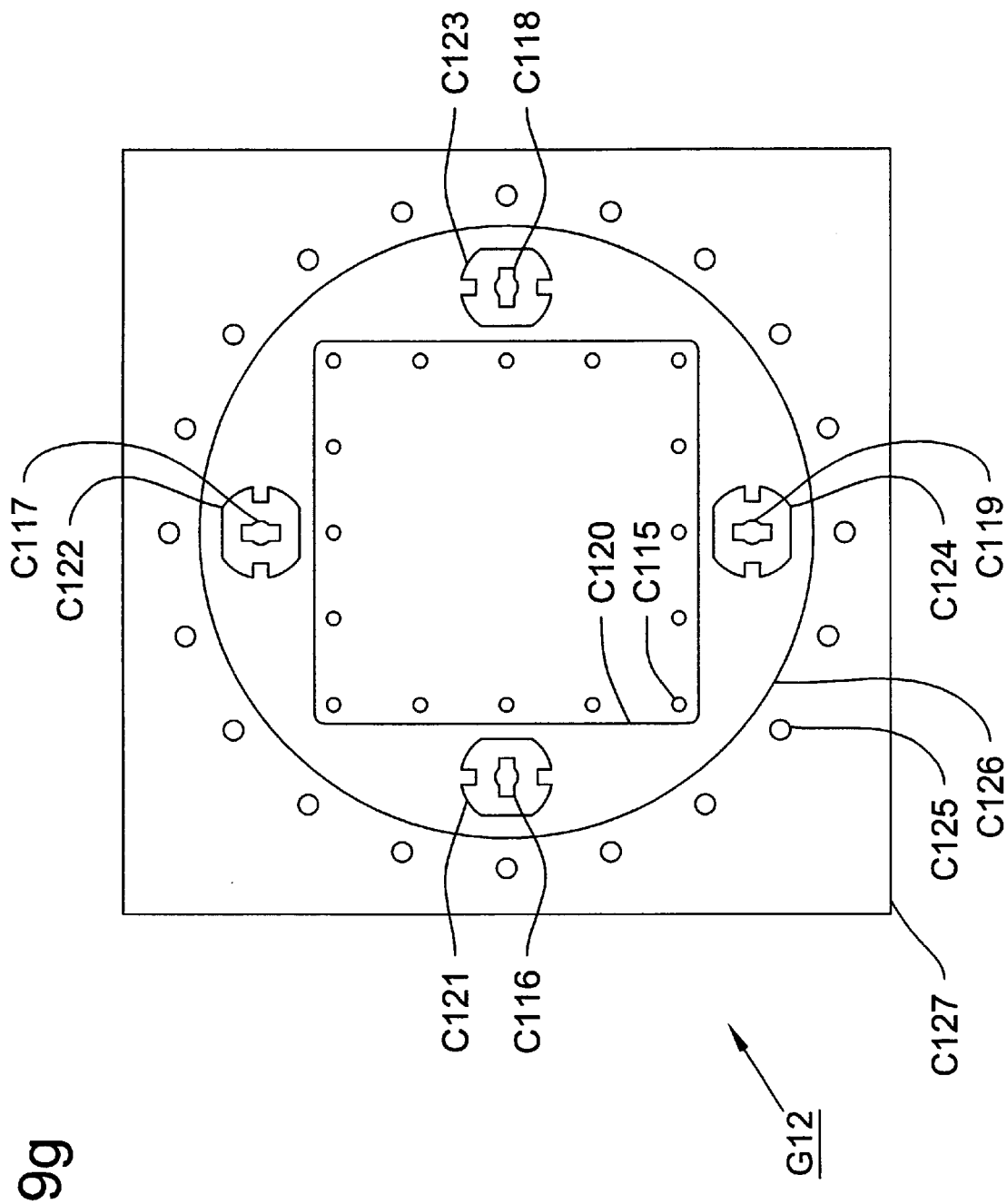

FIGS. 9B–9G are enlarged portions of the workpiece of FIG. 9A, annotated to indicate individual cuts and from which one skilled in the art will perceive the different levels of the cut within a particular group. For example, FIG. 9B represents Group G1 of FIG. 9A. The program has selected Group G1 the first group to be cut. The cut numbers are identified by a numeral preceded by the designator C. The cut numbers are in sequence beginning with C1 and proceeding through C127. The table appended at the end of this specification identifies each of those cuts in sequence. Cut C1 is at level 6 within Group G1 and is a shaped hole. As will be seen by concurrent reference to the table and FIG. 9B, cut number 1, C1, is made within group 1 at level 6 to cut the feature identified as 01, the innermost shaped hole in the upper left of the large rectangular cutout. When that feature is completed, the program traverses the head to cut C2, also at level 6, to cut the feature identified by the coordinates 02. Cut C3 makes a similar cut for the feature identified by coordinates 03. Having completed all of the cuts at level 6, the program then moves to cut C4, which is at level 5 at the coordinates for that level identified feature 01. It will be seen that performing cut C4 cuts the small part OD and causes that part to be separated from the workpiece. Cutting proceeds in the order identified in the table. If while cutting cut number C12, a warning temperature limit is encountered, the control system will finish cut C12, then set a flag C01 at the identifier (01, 04, 07) which is the start point for cut C13. The appended chart has the aforementioned flag noted thereon for this example. At the point cut C12 is completed and flag C01 set, the program will proceed to the next available cutting position, that identified by flag 02. It will be seen that that flag identifies the location for cut C21 which, in referring to FIG. 8B, is seen to be substantially removed from the location at which the temperature limit had been exceeded. The control system would then proceed with the cuts, continuously monitoring the temperature, unless and until another warning or abort temperature limit is reached. The parts within group G1 are completed with the cut C28 which cuts the perimeter of the group G1 part. Having completed that group, the program then sequences to the flag 05 to begin cutting the group identified as G2 (group 02 in the chart), at level 6 and the feature identified by the coordinates 01 within that group.

After the cool down timer triggered by the warning condition encountered in cut C12 has timed out, flag C01 then also becomes a next available cutting position, and at some point the program will revert to that flag and complete the cutting of group G1 parts.

Those skilled in the art will be able to compare the FIGS. 9B–9G with the appended chart to understand the manner in which all of the 127 cuts will be made. If no temperature limits are encountered, they will be made in the order listed in the chart. Whenever a temperature limit is encountered, the order will change. If a warning temperature limit is encountered, the actual cut then in progress will be completed, and a C flag set at the location of the next sequential cut, i.e., at the next geometry intersection. The program will then proceed to the next available cutting position identified by the next P flag or an available C flag. If an abort temperature limit is encountered, cutting will terminate immediately, and a C flag will be set exactly at the coordinates where the cut was aborted. As in the prior case, the program will sequence to the next available position identified by a P or an available C flag and will commence cutting there. In either case, the C flags, be they at the start of a feature or at an intermediate position on the cut path, a cut will be resumed some time during the program run, after the cool down timer marks the associated C flag to be available for cutting.

It can therefore be seen by one of ordinary skill in the art that the present invention provides a new and improved material cutting machine tool having adaptive temperature control. In other words, the material cutting machine tool of the present invention is able to determine ahead of time whether self-burning is likely to ensue, and if so, the particular cut being made can be aborted, and the cutting head can be moved to another area of the workpiece, at a cooler temperature. The quality of the parts cut on such a machine is assured by avoiding onset of self-burning.

CUTTING TABLE

| Cutting Order Cut No. | FIG. | Cut Identifier (Group, Level, Feature) | Comment | Adaptive Temp. Control Flags (P or C No, Group, Level, Feature) |
|---|---|---|---|---|
| 1 | 9b | 01, 06, 01 | Shaped hole | P01, 01, 06, 01 |
| 2 | 9b | 01, 06, 02 | " | |
| 3 | 9b | 01, 06, 03 | " | |
| 4 | 9b | 01, 05, 01 | Small part OD | |
| 5 | 9b | 01, 05, 02 | " | |
| 6 | 9b | 01, 05, 03 | " | |
| 7 | 9b | 01, 04, 01 | All small holes in flange | |
| 8 | 9b | 01, 04, 02 | All small holes in flange | |
| 9 | 9b | 01, 04, 03 | All small holes in flange | |
| 10 | 9b | 01, 04, 04 | Shaped hole | |
| 11 | 9b | 01, 04, 05 | " | |
| 12 | 9b | 01, 04, 06 | Flange ID | |
| 13 | 9b | 01, 04, 07 | " | C01, 01, 04, 07 |
| 14 | 9b | 01, 04, 08 | " | |
| 15 | 9b | 01, 03, 01 | Small part OD | |
| 16 | 9b | 01, 03, 02 | " | |
| 17 | 9b | 01, 03, 03 | Flange OD | |
| 18 | 9b | 01, 03, 04 | " | |
| 19 | 9b | 01, 03, 05 | " | |
| 20 | 9b | 01, 02, 01 | All small holes | |
| 21 | 9b | 01, 02, 02 | " | P02, 01, 02, 02 |
| 22 | 9b | 01, 02, 03 | " | P03, 01, 02, 03 |
| 23 | 9b | 01, 02, 04 | " | P04, 01, 02, 04 |
| 24 | 9b | 01, 02, 05 | Rectangular cutout | |
| 25 | 9b | 01, 02, 06 | Center hole | |
| 26 | 9b | 01, 02, 07 | " | |
| 27 | 9b | 01, 02, 08 | " | |
| 28 | 9b | 01, 01, 01 | Perimeter of part | |
| 29 | 9c | 02, 06, 01 | Shaped hole | P05, 02, 06, 01 |
| 30 | 9c | 02, 06, 02 | " | |
| 31 | 9c | 02, 06, 03 | " | |
| 32 | 9c | 02, 05, 01 | Small part OD | |
| 33 | 9c | 02, 05, 02 | " | |
| 34 | 9c | 02, 05, 03 | " | |

-continued

CUTTING TABLE

| Cutting Order | | Cut Identifier (Group, Level, Feature) | | Adaptive Temp. Control Flags |
|---|---|---|---|---|
| Cut No. | FIG. | | Comment | (P or C No, Group, Level, Feature) |
| 35 | 9c | 02, 04, 01 | All small holes in flange | |
| 36 | 9c | 02, 04, 02 | All small holes in flange | |
| 37 | 9c | 02, 04, 03 | All small holes in flange | |
| 38 | 9c | 02, 04, 04 | Shaped hole | |
| 39 | 9c | 02, 04, 05 | " | |
| 40 | 9c | 02, 04, 06 | Flange ID | |
| 41 | 9c | 02, 04, 07 | " | |
| 42 | 9c | 02, 04, 08 | " | |
| 43 | 9c | 02, 03, 01 | Small part OD | |
| 44 | 9c | 02, 03, 02 | " | |
| 45 | 9c | 02, 03, 03 | Flange OD | |
| 46 | 9c | 02, 03, 04 | " | |
| 47 | 9c | 02, 03, 05 | " | |
| 48 | 9c | 02, 02, 01 | All small holes | |
| 49 | 9c | 02, 02, 02 | " | P06, 02, 02, 02 |
| 50 | 9c | 02, 02, 03 | " | P07, 02, 02, 03 |
| 51 | 9c | 02, 02, 04 | " | P08, 02, 02, 04 |
| 52 | 9c | 02, 02, 05 | Rectangular cutout | |
| 53 | 9c | 02, 02, 06 | Center hole | |
| 54 | 9c | 02, 02, 07 | " | |
| 55 | 9c | 02, 02, 08 | " | |
| 56 | 9c | 02, 01, 01 | Perimeter of part | |
| 57 | 9d | 03, 04, 01 | All small holes | P09, 03, 04, 01 |
| 58 | 9d | 03, 04, 02 | Shaped hole | |
| 59 | 9d | 03, 04, 03 | " | |
| 60 | 9d | 03, 04, 04 | " | |
| 61 | 9d | 03, 04, 05 | " | |
| 62 | 9d | 03, 03, 01 | Radiused square cutout | |
| 63 | 9d | 03, 03, 02 | Small part perimeter | |
| 64 | 9d | 03, 03, 03 | " | |
| 65 | 9d | 03, 03, 04 | " | |
| 66 | 9d | 03, 03, 05 | " | |
| 67 | 9d | 03, 02, 01 | All small holes | |
| 68 | 9d | 03, 02, 02 | " | P10, 03, 02, 02 |
| 69 | 9d | 03, 02, 03 | " | P11, 03, 02, 03 |
| 70 | 9d | 03, 02, 04 | " | P12, 03, 02, 04 |
| 71 | 9d | 03, 02, 05 | Etch bend line | P13, 03, 02, 05 |
| 72 | 9d | 03, 02, 06 | " | |
| 73 | 9d | 03, 02, 07 | All small holes | P14, 03, 02, 07 |
| 74 | 9d | 03, 02, 08 | " | P15, 03, 02, 08 |
| 75 | 9d | 03, 02, 09 | " | P16, 03, 02, 09 |
| 76 | 9d | 03, 02, 10 | Large ID | |
| 77 | 9d | 03, 02, 11 | Center hole | |
| 78 | 9d | 03, 02, 12 | " | |
| 79 | 9d | 03, 02, 13 | " | |
| 80 | 9d | 03, 02, 14 | " | |
| 81 | 9d | 03, 02, 15 | " | |
| 82 | 9d | 03, 02, 16 | " | |
| 83 | 9d | 03, 01, 01 | Perimeter of part | |
| 84 | 9e | 04, 02, 01 | Shaped hole | P17, 04, 02, 01 |
| 85 | 9e | 04, 01, 01 | Perimeter of part | |
| 86 | 9e | 05, 02, 01 | Shaped hole | P18, 05, 02, 01 |
| 87 | 9e | 05, 01, 01 | Perimeter of part | |
| 88 | 9e | 06, 04, 01 | Shaped hole | P19, 06, 04, 01 |
| 89 | 9e | 06, 04, 02 | " | |
| 90 | 9e | 06, 04, 03 | " | |
| 91 | 9e | 06, 04, 04 | " | |
| 92 | 9e | 06, 04, 05 | " | |
| 93 | 9e | 06, 03, 01 | Perimeter of part | |
| 94 | 9e | 06, 03, 02 | " | |
| 95 | 9e | 06, 03, 03 | " | |
| 96 | 9e | 06, 03, 04 | " | |
| 97 | 9e | 06, 03, 05 | " | |
| 98 | 9e | 06, 02, 01 | All small holes | |
| 99 | 9e | 06, 02, 02 | " | |
| 100 | 9e | 06, 02, 03 | Radiused square cutout | |
| 101 | 9e | 06, 02, 04 | OD of part | |
| 102 | 9e | 07, 02, 01 | Shaped hole | P20, 07, 02, 01 |
| 103 | 9e | 07, 01, 01 | Perimeter of part | |
| 104 | 9e | 08, 02, 01 | Shaped hole | P21, 08, 02, 01 |
| 105 | 9e | 08, 01, 01 | Perimeter of part | |
| 106 | 9f | 09, 02, 01 | All small holes | P22, 09, 02, 01 |
| 107 | 9f | 09, 01, 01 | Perimeter of part | |
| 108 | 9f | 10, 02, 01 | All small holes | P23, 10, 02, 01 |
| 109 | 9f | 10, 01, 01 | Perimeter of part | |
| 110 | 9f | 11, 02, 01 | Hole | P24, 11, 02, 01 |
| 111 | 9f | 11, 02, 02 | Rectangular hole | |
| 112 | 9f | 11, 02, 03 | " | |
| 113 | 9f | 11, 02, 04 | Hole | |
| 114 | 9f | 11, 01, 01 | Perimeter of part | |
| 115 | 9g | 12, 04, 01 | All small holes | P25, 12, 04, 01 |
| 116 | 9g | 12, 04, 02 | Shaped hole | |
| 117 | 9g | 12, 04, 03 | " | |
| 118 | 9g | 12, 04, 04 | " | |
| 119 | 9g | 12, 04, 05 | " | |
| 120 | 9g | 12, 03, 01 | Radiused square cutout | |
| 121 | 9g | 12, 03, 02 | Perimeter of part | |
| 123 | 9g | 12, 03, 03 | " | |
| 124 | 9g | 12, 03, 04 | " | |
| 125 | 9g | 12, 02, 01 | All small holes | |
| 126 | 9g | 12, 02, 02 | Large ID | |
| 127 | 9g | 12, 01, 01 | Perimeter of part | |

What is claimed is:

1. A method for controlling a laser-equipped machine tool which energizes a laser and controls machine motion to cut a workpiece according to a stored geometry having intersections, the method comprising the steps of:
   sensing the temperature of the workpiece proximate the cutting nozzle;
   comparing the sensed temperature to a stored warning temperature limit;
   producing a warning signal during the cut in response to the sensed temperature reaching the stored warning limit; and
   responding to the warning signal by aborting the cut when the next geometry intersection is reached.

2. The method of claim 1 wherein the step of responding to warning signal further includes storing parameters of cutting conditions and coordinate location adequate to resume the aborted cut; moving to a next available cutting position on the workpiece and initiating a cut at said next available cutting position.

3. The method of claim 2 further including the step of sensing the temperature of the workpiece at said next available cutting position, comparing the sensed temperature to the stored warning temperature limit, and initiating the new cut only if the sensed temperature is below the stored limit.

4. The method of claim 2 further including the step of subsequently retrieving stored parameters to resume a previously aborted cut.

5. The method of claim 2 further including the steps of activating a cool-down timer to time a cool-down period initiated as a result of the warning signal.

6. The method of claim 2 further including the steps of activating a cool-down timer to time a cool-down period initiated as a result of the warning signal, and flagging the stored parameters for the aborted cut as a marker for return after the cool-down timer times out.

7. The method of claim 2 further including the steps of activating a cool-down timer to time a cool-down period initiated as a result of the warning signal, flagging the stored parameters for the aborted cut as a marker for return after the cool-down timer times out, and setting a flag to an ok-to-proceed status upon time out of the cool-down timer.

8. The method of claim 1 wherein the step of responding to warning signal further includes storing parameters of cutting conditions and coordinate location adequate to resume the aborted cut, activating a cool-down timer to time a cool-down period initiated as a result of the warning signal and if there are no other cutting positions are available, remaining at the existing position until the cool-down timer times out, retrieving the stored parameters and resuming the cut.

9. The method of claim 1 wherein the step of responding to warning signal further includes storing parameters of cutting conditions and coordinate location adequate to resume the aborted cut, activating a cool-down timer to time a cool-down period initiated as a result of the warning signal and if there are no other cutting positions available, remaining at the existing position until the cool-down timer times out, then retrieving the stored parameters, sensing the temperature of the workpiece, comparing the sensed temperature to the warning temperature and if sensed temperature is greater than the warning limit repeating the steps of storing parameters, setting a flag marker, setting a cool-down timer, remaining at the existing position until cool-down timer times out and rechecking the temperature until the temperature is less than the warning limit, then resuming the cut.

10. The method of claim 1 wherein the step of responding to the warning signal further includes the steps of: storing parameters of cutting conditions and coordinate location adequate to resume the aborted cut, flagging the stored parameters for the aborted cut as a marker for return, setting a cool-down timer to time a cool-down period, moving to a next available cutting position, initiating a new cut at said next available cutting position and setting the aborted cut flag to an ok-to-proceed status upon time out of the cool-down time.

11. The method of claim 1 wherein the step of responding to the warning signal further includes the steps of: storing parameters of cutting conditions and coordinate location adequate to resume the aborted cut, flagging the stored parameters for the aborted cut as a marker for return, setting a cool-down timer to time a cool-down period, moving to a next available cutting position, sensing the temperature of the workpiece at said next available cutting position, comparing the sensed temperature to a warning temperature limit, moving to another available cutting position if the sensed temperature is within a pre-established tolerance relative to the warning limit, and setting the aborted cut flag to an ok-to-proceed status upon time out of the cool-down time.

12. A method for controlling a laser-equipped machine tool which energizes a laser and controls machine motion to cut a workpiece, the method comprising the steps of:
sensing the temperature of the workpiece proximate the cutting nozzle;
comparing the sensed temperature to a stored warning temperature limit;
producing a warning signal during the cut when the sensed temperature reaches the stored warning limit;
responding to the warning signal by preparing to abort the cut when the next geometry intersection is reached;
continuing to cut along the path toward the next geometry intersection while comparing the sensed temperature to a stored abort temperature limit higher than the stored warning temperature limit;
producing an abort signal if the sensed temperature during the cut reaches the stored abort limit before the next geometry intersection is reached; and
responding to the abort signal by aborting the cut.

13. The method of claim 12 wherein the step of responding to an abort signal further includes storing parameters of cutting conditions and coordinate location adequate to resume the terminated cut; moving to a next available cutting position on the workpiece and initiating a cut at said next available cutting position.

14. The method of claim 13 further including the step of sensing the temperature of the workpiece at said next available cutting position, comparing the sensed temperature to the stored warning temperature limit, and initiating the new cut only if the sensed temperature is below the stored limit.

15. The method of claim 13 further including the step of subsequently retrieving stored parameters to resume a previously terminated cut.

16. The method of claim 13 further including the steps of activating a cool-down timer to time a cool-down period initiated as a result of the abort signal.

17. The method of claim 13 further including the steps of activating a cool-down timer to time a cool-down period initiated as a result of the abort signal, and flagging the stored parameters for the aborted cut as a marker for return after the cool-down timer times out.

18. The method of claim 13 further including the steps of activating a cool-down timer to time a cool-down period initiated as a result of the abort signal, flagging the stored parameters for the aborted cut as a marker for return after the cool-down timer times out and setting the flag to an ok-to-proceed status upon time out of the cool-down timer.

19. The method of claim 12 wherein the step of responding to an abort signal further includes storing parameters of cutting conditions and coordinate location adequate to resume the aborted cut, activating a cool-down timer to time a cool-down period initiated as a result of the abort signal, and if there are no other cutting positions are available, remaining at the existing position until the cool-down timer times out, retrieving the stored parameters and resuming the cut.

20. The method of claim 12 wherein the step of responding to an abort signal further includes storing parameters of cutting conditions and coordinate location adequate to resume the aborted cut, activating a cool-down timer to time a cool-down period initiated as a result of the abort signal, and if there are no other cutting positions available, remaining at the existing position until the cool-down timer times out, then retrieving the stored parameters, sensing the temperature of the workpiece, comparing the sensed temperature to the warning temperature and if the sensed temperature is greater than the warning limit, repeating the steps of storing parameters, setting a flag marker, setting a cool-down timer, remaining at the existing position until cool-down timer times out and rechecking the temperature until the temperature is less than the warning limit, then resuming the cut.

21. The method of claim 12 wherein the step of responding to the abort signal further includes the steps of: storing parameters of cutting conditions and coordinate location adequate to resume the aborted cut, flagging the stored parameters for the aborted cut as a marker for return, setting a cool-down timer to time a cool-down period, moving to a next available cutting position, initiating a new cut at said next available cutting position and setting the aborted cut flag to an ok-to-proceed status upon time out of the cool-down time.

22. The method of claim 12 wherein the step of responding to the abort signal further includes the steps of: storing parameters of cutting conditions and coordinate location adequate to resume the aborted cut, flagging the stored parameters for the aborted cut as a marker for return, setting a cool-down timer to time a cool-down period, moving to a next available cutting position, sensing the temperature of the workpiece at said next available cutting position, comparing the sensed temperature to a warning temperature limit, moving to another available cutting position if the sensed temperature is within a pre-established tolerance relative to the warning limit, and setting the aborted cut flag to an ok-to-proceed status upon time out of the cool-down time.

23. A method for controlling a laser-equipped machine tool which energizes a laser and controls motion to cut a workpiece by the laser, the method comprising the steps of:
sensing the temperature of the workpiece proximate the cut;
comparing the sensed temperature to a stored warning temperature limit which is predictive of the onset of self-burning;
producing a warning signal during the cut when the sensed temperature reaches the stored warning limit;
responding to the warning signal by aborting the cut prior to the onset of self-burning, then
checking availability of another cutting position and if no other cutting position is available waiting until the temperature falls below the warning temperature, then resuming the cut.

24. In a laser-equipped machine tool having a laser, a motorized drive for causing relative motion between a cutting head and a workpiece to cut shapes in different areas of the workpiece, and a computer numeric control for controlling the laser and controlling movement of the motorized drive, the combination comprising:
a temperature sensor for monitoring the temperature of the workpiece proximate the cut, and generating a temperature signal;
a memory storing a temperature limit predictive of the onset of self-burning;
a comparator comparing the temperature signal to the limit and generating an abort signal if the temperature signal reaches the limit;
the laser having a control input responsive to the abort signal for terminating the laser beam before self-burning commences; and
a timer recording the time elapsed since the abort signal and generating a ok-to-resume signal after a predetermined cooling time period has passed.

25. The combination of claim 24 wherein said memory includes memory locations for storing a plurality of said temperature limits predictive of the onset of self-burning in a plurality of materials, and further including a user input station for entering information on a particular material being cut so as to select the temperature limit associated with the particular material.

26. A laser-equipped machine tool, comprising in combination:
a laser source emitting a laser beam and having a control input for a processor;
a cutting head for focusing the laser beam onto a workpiece to be cut, the cutting head being selectively positionable relative to the workpiece to cut shapes in the workpiece;
a drive system for controlling relative motion between the cutting head and the workpiece;
a temperature sensor positioned relative to the cutting head to sense the temperature of the workpiece proximate the cut;
a processor electrically connected to the temperature sensor, to the drive, and to the control input of the laser, the processor having storage locations for temperature limits predictive of the onset of self-burning; the processor programmed to compare the sensed temperature to a stored limit and signal an abort condition when the sensed temperature reaches a pre-established tolerance relative to the stored limit, the processor being programmed to respond to an abort condition by aborting the cut prior to the initiation of self-burning, wherein the processor is further programmed to respond to an abort condition signal by:
storing cutting conditions at the time of the abort;
storing coordinate locations of the position of the cut at the time of the abort;
flagging the stored cutting and coordinate location data as a marker for return;
initiating a cool-down timer; and
moving to a next available cutting position to resume cutting.

27. The combination of claim 26 wherein the processor sets the flag of the aborted cut to an ok-to-return status upon time out of the cool-down timer.

28. The combination of claim 26 wherein the processor is programmed to retrieve the cutting conditions stored in response to an abort condition and to resume the interrupted cut at the point of interruption.

29. The combination of claim 26 wherein the processor is programmed to test the temperature of the workpiece before resuming the interrupted cut.

30. The combination of claim 26 wherein the processor aborts a first cutting location and directs movement to a second cutting location if the sensed temperature at the first cutting location exceeds a pre-determined temperature limit.

31. The combination of claim 26 wherein the processor may direct movement to a previously aborted flagged position when moving to the next available cutting position.

32. The combination of claim 26 wherein the processor stores a warning temperature limit which is lower than an abort temperature limit, and signals a warning condition if the sensed temperature reaches or exceeds the warning limit, in the warning condition the processor being programmed to:
complete the cut then in progress until an end of cut position is reached, and thereafter
(a) interrupt the laser to interrupt the cut;
(b) store cutting conditions at the time of the abort;
(c) store coordinate locations of the position of the cutting head at the time of the abort;
(d) flag the stored cutting conditions and coordinate location parameters as a marker for return; and
(e) initiate movement to a next available cutting position.

33. A laser-equipped machine tool, comprising in combination:
a laser source emitting a laser beam and having a control input for a processor;

a cutting head for focusing the laser beam onto a workpiece to be cut, the cutting head being selectively positionable relative to the workpiece to cut shapes in the workpiece;

a drive system for controlling relative motion between the cutting head and the workpiece;

a temperature sensor positioned relative to the cutting head to sense the temperature of the workpiece proximate the cut;

a processor electrically connected to the temperature sensor, to the drive, and to the control input of the laser, the processor having storage locations for temperature limits predictive of the onset of self-burning; the processor programmed to compare the sensed temperature to a stored limit and signal an abort condition when the sensed temperature reaches a pre-established tolerance relative to the stored limit, the processor being programmed to respond to an abort condition by aborting the cut prior to the initiation of self-burning then check for availability of another cutting position and if another cutting position is not available to wait until the temperature falls below a stored limit then resume the cut.

34. A method of cutting a workpiece with a laser-equipped machine tool operated under the control of a parts program which sets start point flags for a plurality of sequential cuts to be made in the workpiece, the method comprising the steps of:

operating the machine tool in accordance with the parts program to cut the parts;

monitoring the workpiece temperature to continuously assess the risk of onset of self-burning;

responding to a risk of onset of self-burning during an active cut by:
 (a) terminating the active cut;
 (b) jumping to a new cut identified by a flag in the parts program; and
 (c) setting a restart flag to mark the terminated cut for later completion.

35. The method of claim 34 wherein the step of terminating the active cut comprises continuing the active cut until a geometry intersection in the parts program is reached then aborting the cut.

36. The method of claim 34 wherein the step of terminating the active cut comprises immediately aborting the active cut.

37. The method of claim 34 which includes the further step of responding to a risk of onset of self-burning during another active cut by:
 (a) terminating the then-active cut;
 (b) jumping to a new cut identified by a restart flag, and
 (c) setting a new restart flag to mark the terminated cut for later completion.

* * * * *